(12) United States Patent
Dagenais et al.

(10) Patent No.: US 9,862,297 B2
(45) Date of Patent: Jan. 9, 2018

(54) VEHICLE TRAILER SYSTEM

(71) Applicants: Frederick W. Anton Engelbrecht, Cape Coral, FL (US); Richard Alan Stahl, Englewood, FL (US); Marshall Roy Crosby, Jonesboro, GA (US)

(72) Inventors: Roderick R. Dagenais, Sarasota, FL (US); Richard Alan Stahl, Englewood, FL (US); Marshall Roy Crosby, Jonesboro, GA (US)

(73) Assignee: SELECTRAILERS, L.L.C, Englewood, FL (US)

( * ) Notice: Subject to any disclaimer, the term of this patent is extended or adjusted under 35 U.S.C. 154(b) by 0 days.

(21) Appl. No.: 15/059,960

(22) Filed: Mar. 3, 2016

(65) Prior Publication Data

US 2016/0257237 A1 Sep. 8, 2016

Related U.S. Application Data

(60) Provisional application No. 62/128,423, filed on Mar. 4, 2015.

(51) Int. Cl.
*B60P 1/43* (2006.01)
*B60P 1/48* (2006.01)
*B60P 1/64* (2006.01)

(52) U.S. Cl.
CPC .............. *B60P 1/433* (2013.01); *B60P 1/483* (2013.01); *B60P 1/6454* (2013.01)

(58) Field of Classification Search
CPC ......... B60P 1/6454; B60P 1/433; B60P 1/483; B60P 1/32; B60P 1/6463
See application file for complete search history.

(56) References Cited

U.S. PATENT DOCUMENTS

| | | | | |
|---|---|---|---|---|
| 2,786,590 A | * | 3/1957 | Edwards | B60P 3/07 105/90.2 |
| 4,225,280 A | * | 9/1980 | Brunet | B60P 1/6454 414/479 |
| 4,384,816 A | * | 5/1983 | Martin | B60P 1/32 298/1 B |
| 4,629,379 A | | 12/1986 | Harris et al. | |
| 5,000,645 A | * | 3/1991 | Polojarvi | B60P 1/6454 298/11 |

(Continued)

*Primary Examiner* — Kaitlin Joerger
(74) *Attorney, Agent, or Firm* — H. John Rizvi; Gold & Rizvi, P.A

(57) ABSTRACT

A vehicle trailer system for loading, transporting and unloading a load includes a wheeled trailer structure for attachment to a towing vehicle; a carriage mounted for bidirectional travel on the trailer structure; a carriage hitch carried by the carriage, the carriage hitch configured for coupling to the load; a movable, preferably pivotable arm carried by the trailer structure; and an arm actuating cylinder operably engaging the movable arm to selectively position the movable arm in lowered and raised positions. In a first raised position, the movable arm can suspend a cable attached to the load and lift the load when the cable is pulled by a winch. In a second raised position, the movable arm can arrange the cable so that it presents a strong vertical component for lowering the load onto the carriage hitch. When the movable arm is arranged in the lowered position, the carriage can travel over the movable arm as the cable pulls the load onto the trailer structure.

20 Claims, 18 Drawing Sheets

(56) References Cited

U.S. PATENT DOCUMENTS

| | | | |
|---|---|---|---|
| 5,203,668 A * | 4/1993 | Marmur | B60P 1/6454 414/480 |
| 5,213,466 A * | 5/1993 | Bubik | B60P 3/122 414/494 |
| 5,232,329 A * | 8/1993 | Livingston | B60P 1/54 414/462 |
| 5,237,784 A | 8/1993 | Ros | |
| 5,775,868 A | 7/1998 | Mann | |
| 5,816,765 A * | 10/1998 | Pijanowski | B60P 3/122 298/9 |
| 6,164,862 A | 12/2000 | Takaguchi | |
| 6,364,584 B1 | 4/2002 | Taylor | |
| 6,419,292 B1 * | 7/2002 | Calcote | B60P 1/6454 296/35.3 |
| 6,631,917 B1 * | 10/2003 | Chapman | B60P 1/6463 280/491.5 |
| 6,729,098 B1 | 5/2004 | Brennan, Jr. | |
| 7,125,212 B2 | 10/2006 | Moore et al. | |
| 7,568,881 B1 * | 8/2009 | Collins | B60P 1/6463 414/346 |
| 7,717,290 B2 | 5/2010 | Gerding | |
| 7,901,174 B2 * | 3/2011 | Cullum | B64F 1/32 244/137.1 |
| 8,166,715 B2 | 5/2012 | De Azambuja | |
| 8,444,365 B2 * | 5/2013 | Duell | B60P 1/6454 414/494 |
| 8,459,925 B2 * | 6/2013 | Mullin | B60P 1/32 414/346 |
| 8,465,246 B2 * | 6/2013 | Duell | B60P 1/6463 414/480 |
| 8,550,274 B2 | 10/2013 | Gerding | |
| 8,720,126 B2 | 5/2014 | Strickland et al. | |
| 8,770,422 B2 | 7/2014 | Cantin et al. | |
| 8,870,517 B2 * | 10/2014 | Jones | B60P 1/6427 414/478 |
| 9,017,003 B2 * | 4/2015 | Nims | A61G 3/0236 414/479 |
| 9,403,470 B2 * | 8/2016 | Obermeyer | B60P 1/6463 |
| 2007/0092364 A1 * | 4/2007 | Geise | B60P 1/6463 414/467 |
| 2010/0086387 A1 * | 4/2010 | Fought | B60P 1/6463 414/491 |
| 2012/0144998 A1 | 6/2012 | Burgo | |
| 2013/0034422 A1 | 2/2013 | Warburton | |
| 2013/0243555 A1 * | 9/2013 | Boivin | B60P 1/6454 414/546 |
| 2014/0064894 A1 | 3/2014 | Piekny | |
| 2016/0046227 A1 * | 2/2016 | Bartelt | B60P 1/6463 414/498 |
| 2016/0339824 A1 * | 11/2016 | Dagenais | B62D 63/061 |

* cited by examiner

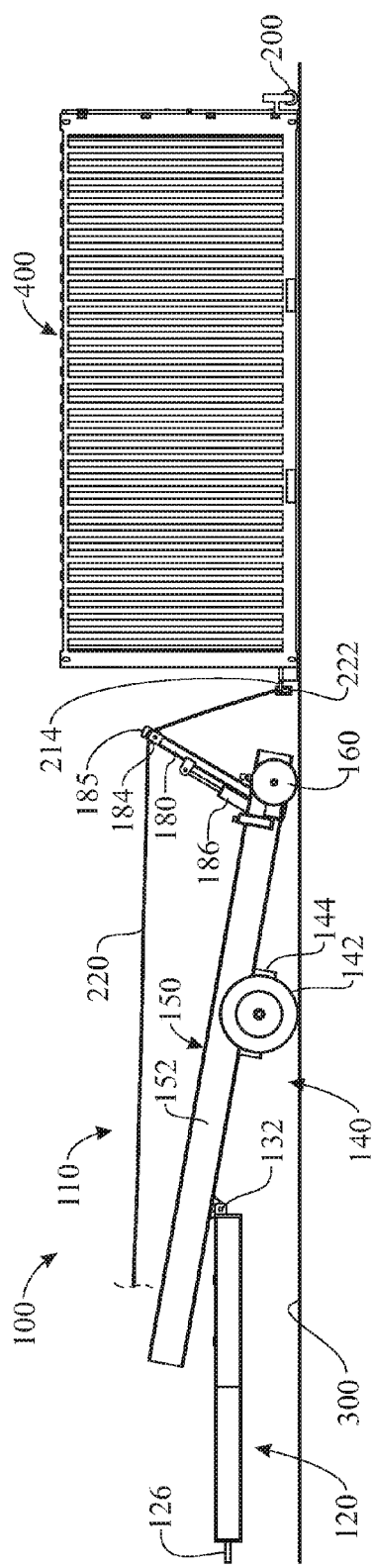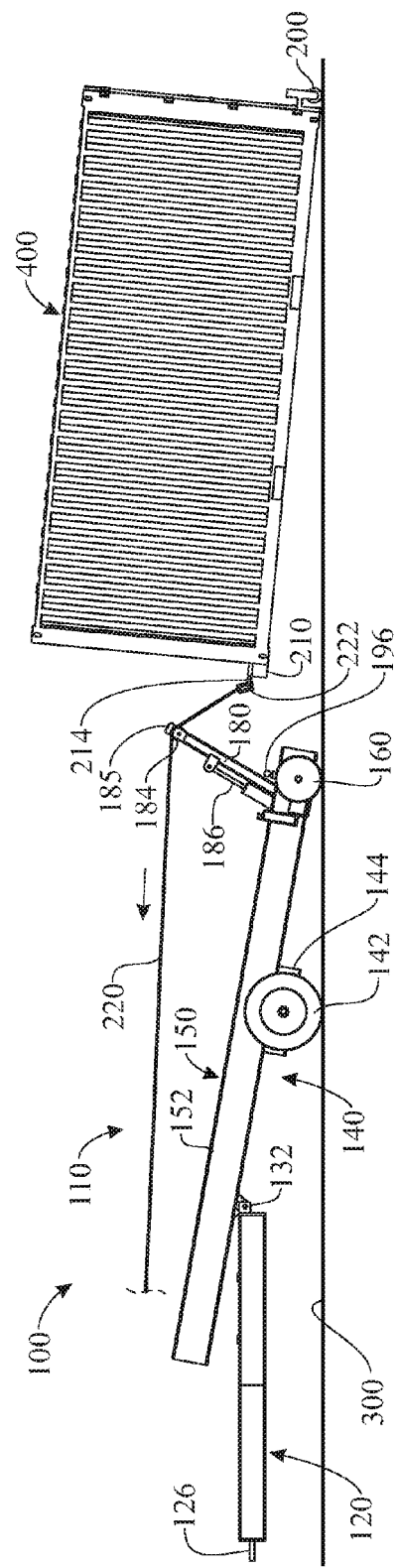

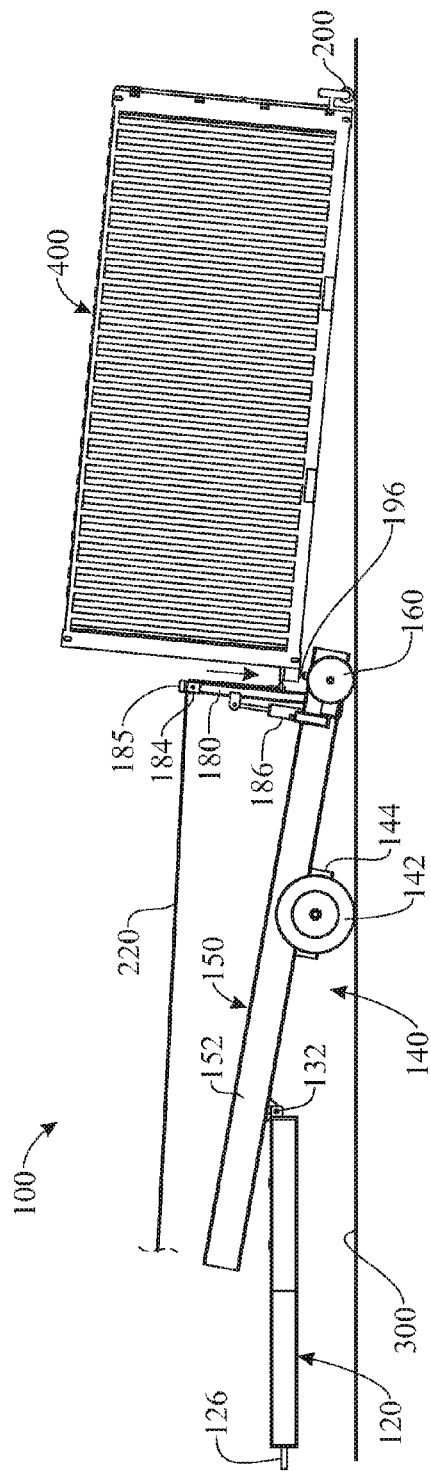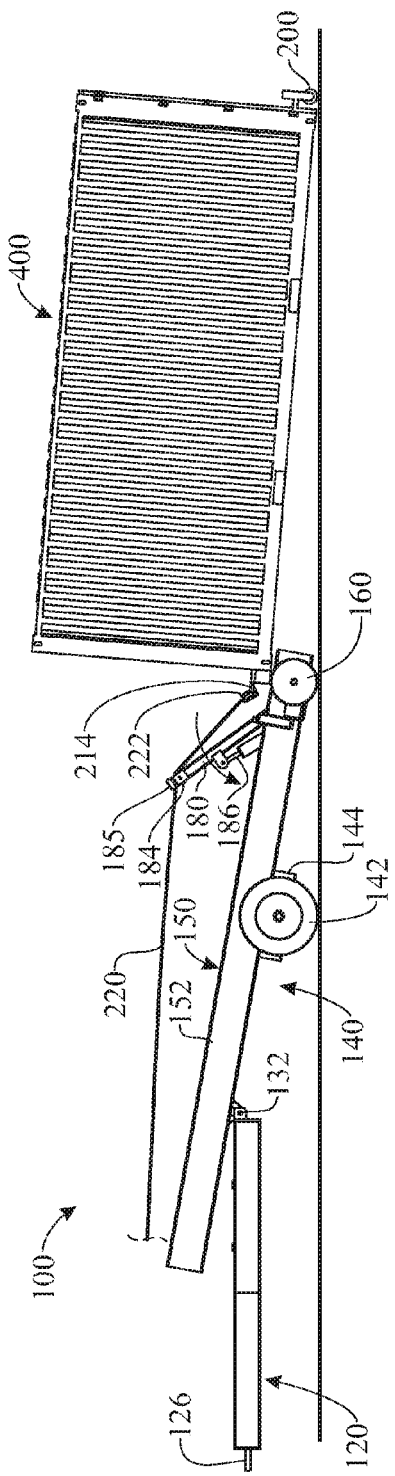
FIG. 9
FIG. 10

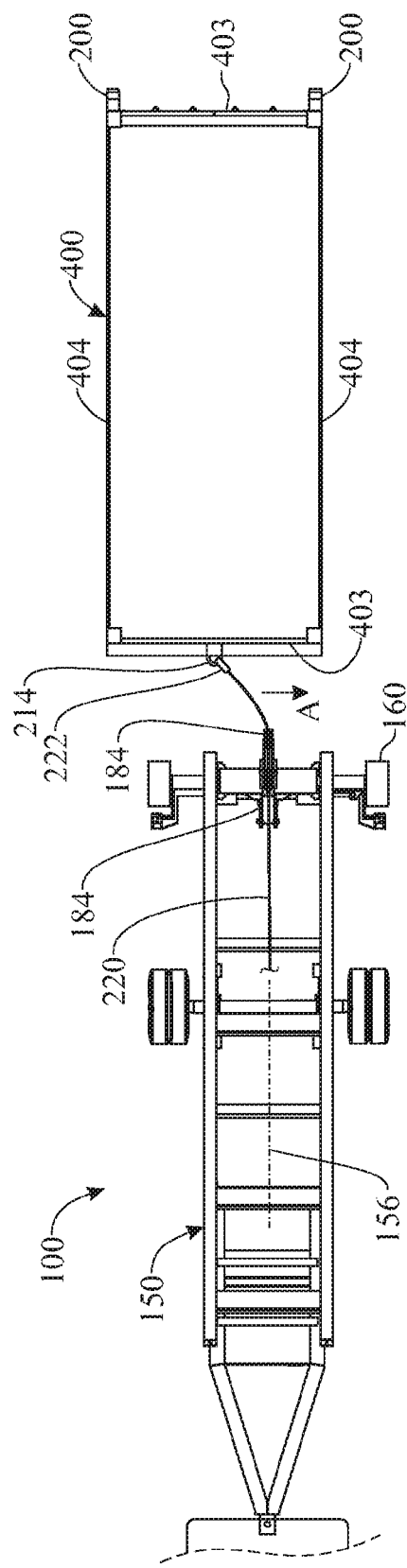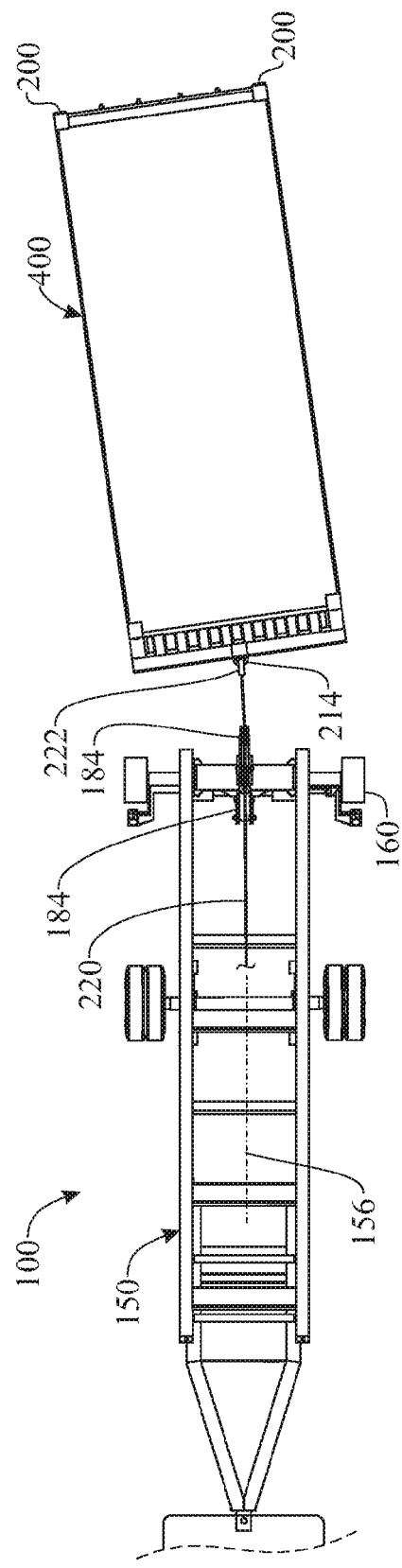
FIG. 19
FIG. 20

VEHICLE TRAILER SYSTEM

CROSS-REFERENCE TO RELATED APPLICATION

This application claims the benefit of U.S. Provisional Patent Application Ser. No. 62/128,423, filed Mar. 4, 2015, which is incorporated by reference herein in its entirety.

FIELD OF THE INVENTION

The present invention relates generally to trailers, and more particularly, to a vehicle trailer system including a movable, preferably pivotable arm and winding cable for lifting a load, and a translational carriage including a load hitch for coupling the load thereon. The vehicle trailer system is suitable for loading, transporting and unloading a load such as a cargo container and facilitates ease in loading the cargo container onto a trailer.

BACKGROUND OF THE INVENTION

Cargo containers, such as intermodal containers, freight containers, ISO containers, shipping containers, hi-cube containers or the like, are generally metallic structures vastly used to transport items or materials over land via roadways or railways or via sea transportation. In military applications, for example, cargo containers may be used to transport equipment or shelters for various military operations. In civilian applications, cargo containers may be used to transport a variety of different types of equipment or materials. Cargo containers can also be used to temporarily or permanently store objects.

Conventional cargo containers typically include a floor, walls extending from the floor and a roof on the walls. One or more doors may be provided in the walls of the containers. Containers can also typically include fasteners, or fastening portions to which fasteners can be coupled, to allow securing the containers during loading, unloading and transportation. For instance, ISO containers include eight ISO connectors, one at each corner of the container, for attaching ISO compliant fasteners.

Loading and unloading of cargo containers onto or from ships, trains or other means of transportation or storage can be carried out by various means. For instance, vertically lifting cranes can be used to load and unload containers in large vessels or freights. Alternatively, reach stackers can be used for stacking a reduced number of containers, such as onto a train.

Loading and unloading a container onto a truck or other vehicle trailer is also possible. For this purpose, vehicle trailer systems are known in the art comprising a tiltable trailer bed and a winch capable of dragging the container onto the trailer bed. A front side of the container is initially lifted from the ground by inserting a wedge underneath the container front end (by pure force). The container is then dragged onto a tilted trailer bed which is coupled to a towing vehicle. After the container is loaded, the trailer is tilted to a generally horizontal transport position for transport of the container to the desired destination.

During loading, friction between the container and the trailer may be considerable. Thus, power which is expended in the loading process may be high. In addition, misalignments between the container and the trailer bed may greatly hinder loading of the container, as alignment cannot be corrected due to the elevated friction between the trailer bed and the container. This is an important drawback, as in practice it can be very difficult to achieve an optimum longitudinal alignment between the trailer and the container for loading.

Accordingly, there is an established need for a vehicle trailer system which is suitable for loading, transporting and unloading a load such as a cargo container, which allows for simple and effective loading, transportation and unloading of a cargo container on and from a trailer without damaging the container or its contents, and is thus valid for transporting virtually any kind of cargo including fragile items.

SUMMARY OF THE INVENTION

The present invention is directed to a vehicle trailer system which is suitable for loading, transporting and unloading a load such as a cargo container and which facilitates ease in loading and unloading a cargo container onto and from a trailer, allowing cargo containers to be loaded, transported and stored by smaller trailers in comparison to prior art, and thus boosting the use of cargo containers for a myriad of civil and military applications such as providing temporary housing during disaster relief. The vehicle trailer system includes a trailer structure which can be coupled to a towing vehicle such as a pickup truck. The trailer structure can include a trailer front structure and a trailer rear structure attached to the trailer front structure. The trailer rear structure can include a pivotable structure that is pivotably attached to the trailer front structure and supported by wheels. The trailer structure includes a longitudinally-traveling carriage or trolley including a preferably ball-shaped, carriage hitch. A winch cable can be extended or unwound from a winch that can be mounted on the front structure of the vehicle trailer system or on the towing vehicle and that is connected to the load as the load rests on the ground behind the trailer. A movable, preferably pivotable arm can dispose the cable in a first suspended position in which the cable can be attached to the load and pull and lift the load. The movable arm can then be moved to dispose the cable in a second position with a strong vertical component for the cable to lower the load onto the carriage hitch and couple the load to the carriage. The movable arm can then be operated to pivot away from the cable and fold into the trailer structure. Subsequent operating of the winch causes the cargo container to be pulled onto the trailer by the carriage, until the cargo container is fully supported by the trailer.

In a first implementation of the invention, a vehicle trailer system for loading, transporting and unloading a load includes a trailer, arranged along a front-to-back, longitudinal direction, the trailer comprising a wheeled trailer structure for attachment to a towing vehicle. The trailer further includes a carriage mounted for bidirectional travel on the trailer structure along the longitudinal direction. A carriage hitch is carried by the carriage, the carriage hitch configured for coupling to a load. A movable arm is carried by the trailer structure. An arm actuator is carried by the trailer structure and operably engages the movable arm to selectively position the movable arm in a lowered position in which the carriage can travel over the movable arm, and in a plurality of raised positions in which the movable arm extends above the carriage. A flexible, windable elongated element (e.g., a cable) is supported by the arm actuator in at least one of the raised positions and includes a fastener for coupling to and pulling the load.

In a second aspect, the movable arm can be pivotable about a side-to-side, transverse rotation axis and along a vertical longitudinal plane which is longitudinally aligned with the carriage hitch.

In another aspect, the wheeled trailer structure can include a trailer front structure for attachment to the towing vehicle, and a trailer rear structure, pivotably attached to the trailer front structure about a side-to-side, transverse pivot axis. The movable arm is preferably pivotably carried by the trailer rear structure.

In another aspect, the trailer rear structure can include a pivotable structure pivotably attached to the trailer front structure and supported on the ground by at least one pair of wheels.

In another aspect, the pivotable structure of the trailer rear structure can include a pair of spaced-apart trailer rails and the carriage can be translationally mounted on the trailer rails. The carriage can be arranged between the trailer rails.

In another aspect, the carriage hitch can include a hitch ball providing a ball-joint coupling with the load. The ball-joint coupling can be arranged vertically higher than adjacent portions of the trailer structure to facilitate rotation of the load relative to the trailer structure about the ball-joint coupling.

In another aspect, the vehicle trailer system can further include at least one roller attachable to the load. The vehicle trailer system can also include a hitch structure removably attachable to the load, the hitch structure comprising a hitch coupler for engaging with the carriage hitch, and a fastener for coupling the fastener of the flexible, windable elongated element.

In another aspect, the movable arm can further include a retainer transversely retaining the flexible, windable elongated element within the movable arm when the flexible, windable elongated element is supported by the movable arm.

In another aspect, the movable arm can include at least one pulley from which the flexible, windable elongated element is suspended in at least one of the plurality of raised positions.

In another aspect, the trailer structure can further include at least one trailer roller arranged at a rear end of the trailer structure. The trailer roller or rollers are rotatable about a side-to-side, transverse rotational axis for the longitudinal rolling thereon of the load. For instance, the trailer structure can include two trailer rollers, one on each opposite side of a rear end of the trailer structure.

In another aspect, the vehicle trailer system can further include at least one user-operable control for operating the arm actuator.

In another aspect, the vehicle trailer system can further include a winch for winding and unwinding the flexible, winding elongated element, and at least one user-operable control for operating the winch.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 7 presents a side elevation view of the vehicle trailer system preparatory to loading of a cargo container onto the trailer;

FIG. 8 presents a side elevation view of the vehicle trailer system after loading of the cargo container has begun;

FIG. 9 presents a side elevation view of the vehicle trailer system illustrating coupling of the cargo container to the trailer;

FIG. 10 presents a side elevation view of the vehicle trailer system with the cargo container coupled to the trailer and the movable arm being operated to rotate from the raised position towards the lowered position:

FIG. 19 presents a top plan view of the vehicle trailer system preparatory to loading of a cargo container onto the trailer, similarly to FIG. 7, but wherein the cargo container is slightly offset from the trailer;

FIG. 20 presents a top plan view of the vehicle trailer system and cargo container of FIG. 19, after loading of the cargo container has begun and the cargo container has automatically shifted towards the pulley;

Like reference numerals refer to like parts throughout the several views of the drawings.

DETAILED DESCRIPTION

Figure 1:
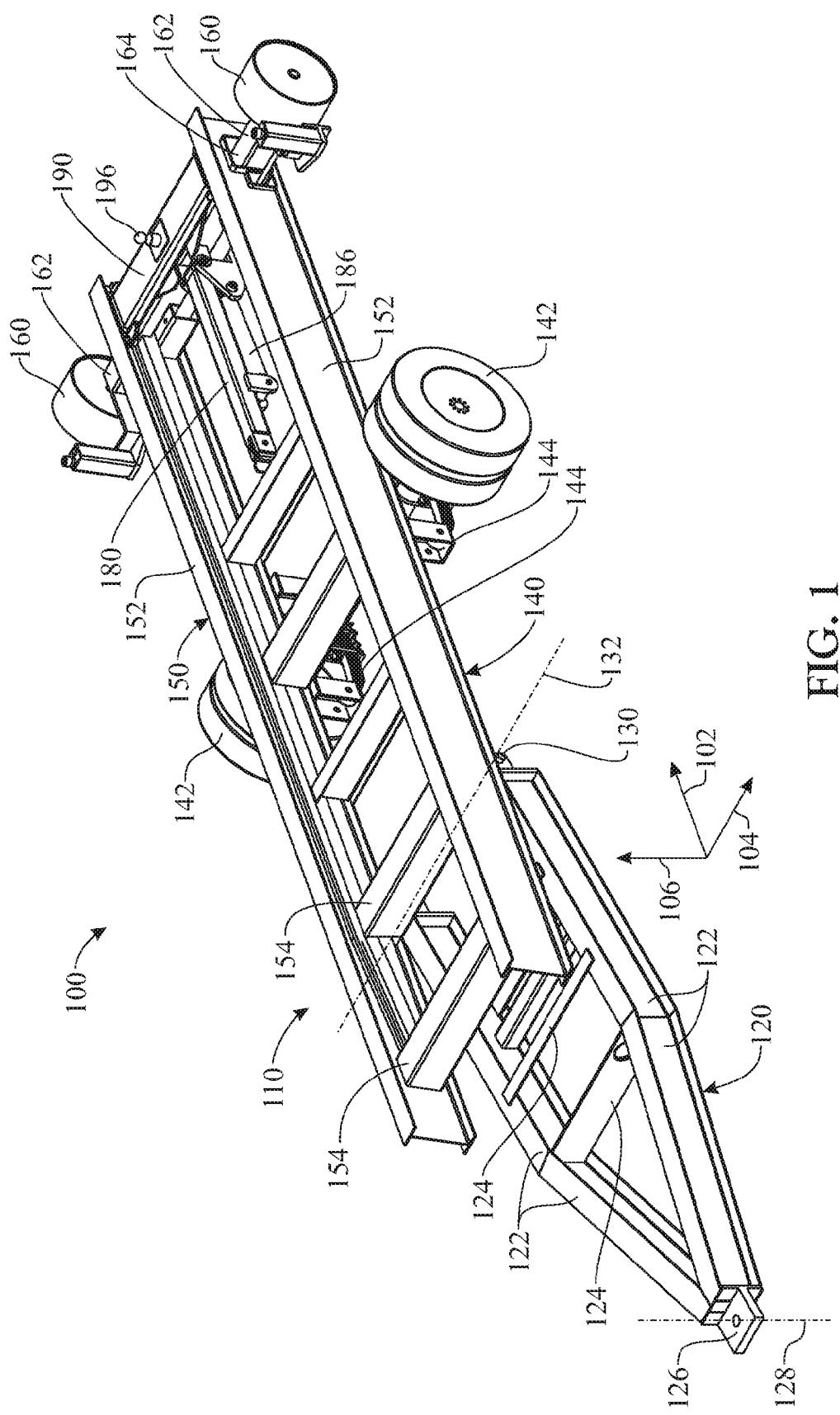
FIG. 1 presents a front perspective view of an illustrative embodiment of the vehicle trailer system of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a vehicle trailer system which is suitable for loading, transporting and unloading a load such as a cargo container and which facilitates ease in loading a cargo container onto a trailer. As will be illustrated hereinafter, the vehicle trailer system in accordance with the invention requires a minimal trailer length for loading and unloading the container. In consequence, the trailer system may present a relatively small length in comparison to container-transporting trailer systems known currently in the art in which the container is dragged onto a tilted trailer bed. In addition, because the vehicle trailer system needs not be as long as conventional container-dragging vehicle trailer systems, the vehicle trailer system of the present invention can present a reduced weight and thus permit the container to carry an increased load. Moreover, as will be explained, the vehicle trailer system of the present invention minimizes friction between the trailer and the container while loading and unloading the container, thus minimizing the force and power required to pull the container and providing an extremely smooth and non-jerky loading of the container. In consequence, the pulling mechanism or winch carried by the trailer or truck will be required to exert a minimal force and power in comparison to conventional container-dragging vehicle trailer systems. In practice, the vehicle trailer system of the present invention will permit cargo containers to be able to be towed by a greater variety of vehicles, which will ultimately allow containers to become widely utilized as their loading, transportation and unloading will not necessarily have to be driven by larger and more costly vehicles such as semi-trailer trucks of the kind that do not include a forklift crane.

Referring initially to FIGS. 1-6, an illustrative embodiment of the vehicle trailer system in accordance with the present invention is depicted. The vehicle trailer system 100 includes a trailer 110 for supporting and transporting cargo, such as but not limited to a cargo container 400 such as that of FIG. 2. As shown in FIG. 1, the trailer 110 is generally elongated along a length-wise, front-to-back or longitudinal direction 102, and comprises a trailer front structure 120 for attachment to a towing vehicle, and a trailer rear structure 140 which is pivoted to the trailer front structure 120, as will be explained hereinafter. A width-wise, side-to-side or transverse direction 104 is further defined, as shown in FIG. 1, together with a height-wise, top-to-bottom or vertical direction 106. Reference is made to the three orthogonal directions 102, 104, 106 throughout the present disclosure. In addition, unless expressly mentioned otherwise, the terms "longitudinal" and "transverse" shall be understood throughout the present document to mean in the longitudinal direction 102 and the transverse direction 104, respectively.

The trailer front structure 120 of the present embodiment is configured to be coupled to a towing vehicle (not illustrated). The trailer front structure 120 may include a pair of side frame members 122 and at least one frame brace 124 to form a rigid structure. A trailer hitch coupler 126 may be provided on the trailer front structure 120 to facilitate coupling of the trailer front structure 120 to a companion hitch (not illustrated) on the towing vehicle, such as but not limited to a ball-type hitch. The attachment between the trailer hitch coupler 126 and the companion hitch on the vehicle may facilitate pivoting of the trailer front structure 120 in a horizontal plane (i.e. about a vertical rotation axis 128) with respect to the towing vehicle.

The trailer rear structure 140, in turn, comprises at least one pair of trailer wheels 142 and a pivotable structure 150 which is supported on the ground by the at least one pair of trailer wheels 142. The trailer rear structure 140 may further include a suspension system 144 (FIG. 1) which provides relative vertical movement between the trailer wheels 142 and the pivotable structure 150. In addition, in certain embodiments, the suspension system 144 can provide a relative transverse movement between the pivotable structure 150 and the trailer wheels 142.

The pivotable structure 150 of the trailer rear structure 140 of the present embodiment may include a pair of generally elongated trailer rails 152, arranged along the longitudinal direction 102, parallel and spaced-apart with respect to each other. At least one frame brace 154 may connect the trailer rails 152 to form a rigid structure. The frame braces 154 of the present embodiment are arranged transversely, i.e., perpendicular to the longitudinal trailer rails 152. The pivotable structure 150 of the trailer rear structure 140 of the present embodiment is pivotably attached to the trailer front structure 120 by having the trailer rails 152 pivotally attached to a respective side frame member 122 of the trailer front structure 120. An articulated connection is provided between each trailer rail 152 and the respective side frame member 122 of the trailer front structure 120; each articulated connection of the present embodiment is provided by a respective pivot pin 130. The articulated connections or pivot pins 130 define a pivot axis 132, which in the present embodiment is arranged in the transverse direction 104. Accordingly, the pivotable structure 150 of the trailer rear structure 140 may be selectively pivoted vertically upward and downward with respect to the trailer front structure 120.

With continued reference to FIG. 1, a pair of trailer rollers 160 may be provided on the trailer 110, and particularly on the rear end of the pivotable structure 150 of the trailer rear structure 140. The trailer rollers 160 may be mounted for rotation on a pair of roller mount members 162, respectively, which extend outwardly from the respective trailer rails 152 generally at or adjacent to the rear end of the trailer 110. The pair of roller mount members 162 of the present embodiment are provided by opposite ends of a rear crossbeam 164, which extends across the pivotable structure 150. In alternative embodiments, the roller mount members 162 can be integrally formed with or affixed to an outer surface of each trailer rail 152. The purpose of the trailer rollers 160 will be hereinafter described.

Figure 3:
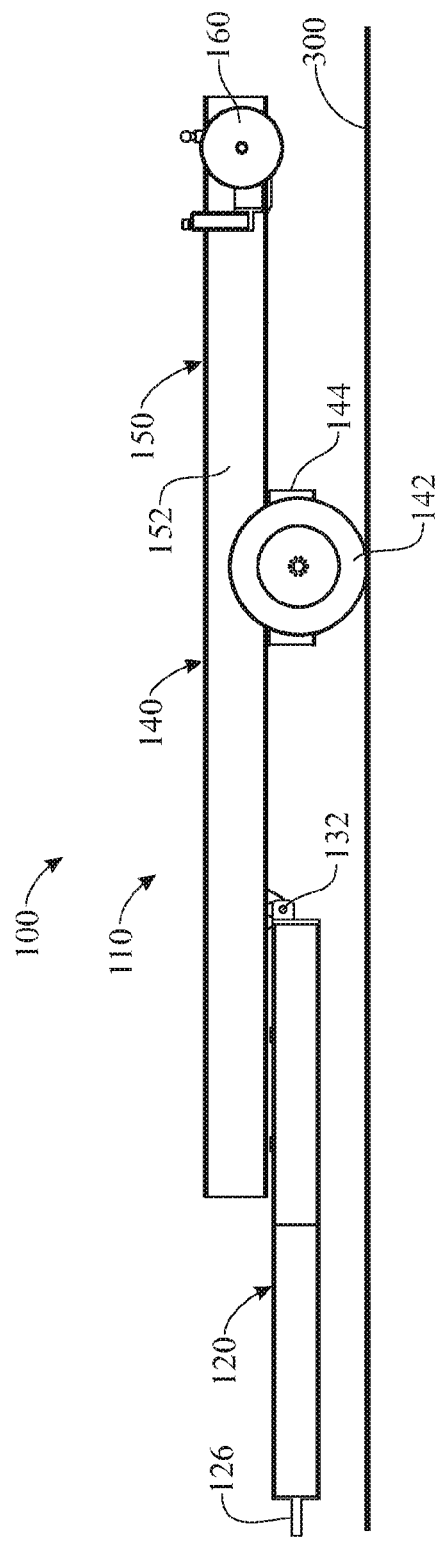
FIG. 3 presents a side view of a trailer of the vehicle trailer system of the present invention, deployed in a container transporting configuration.
Figure 4:
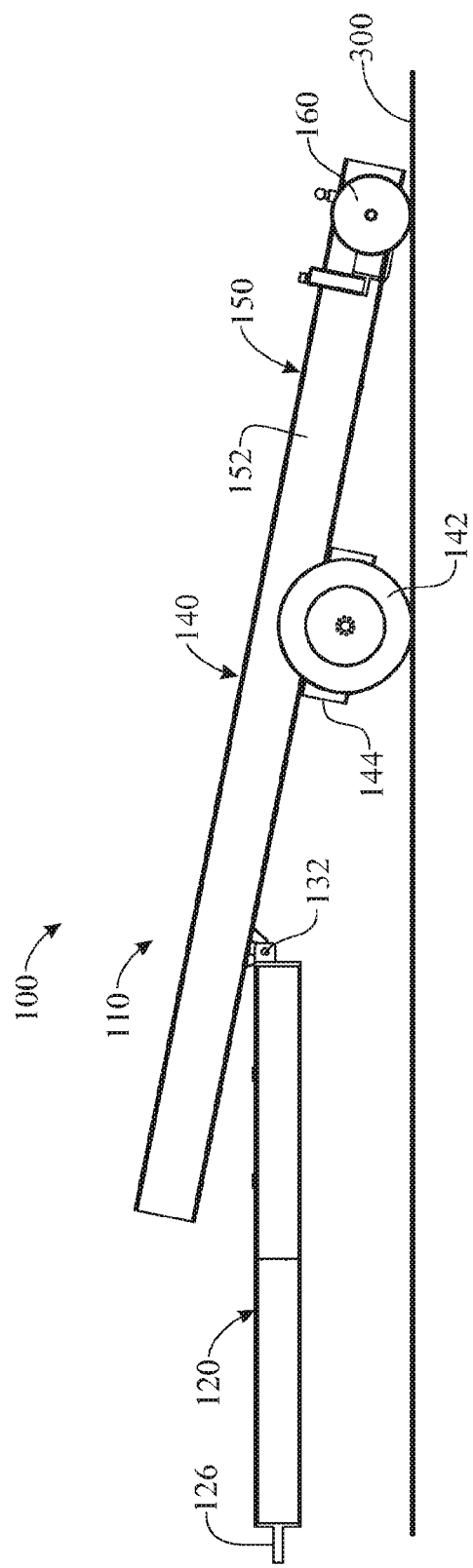
FIG. 4 presents a side view of a trailer of the vehicle trailer system of the present invention, deployed in a container loading and unloading configuration.

The illustrations of FIGS. 3 and 4 present the trailer rear structure 140, and particularly the pivotable structure 150 of the trailer rear structure 140, in two different pivotal positions in relation to the trailer front structure 120. In a first pivotal position, shown in FIG. 3, the pivotable structure 150 of the trailer rear structure 140 is pivoted upward about the pivot axis 132, and the trailer rails 152 are arranged in a generally horizontal position, while the trailer wheels 142 are supported on the ground 300. In addition, the trailer rollers 160 are elevated and not in contact with the ground 300. In a second pivotal position, shown in FIG. 4, the pivotable structure 150 of the trailer rear structure 140 is pivoted downward or clockwise about the pivot axis 132, and the trailer rails 152 are arranged in an oblique direction, while the trailer wheels 142 continue to be supported on the ground 300. In this second pivotal position, the trailer rollers 160 have come into contact with and rest on the ground 300. In some embodiments, the trailer front structure 120 can adjust its vertical position when the pivotable structure 150 transitions between the first pivotal position and the second pivotal position, such as by having the trailer hitch coupler 126 vertically re-adjustable while the trailer front structure 120 remains horizontal, for instance as shown in FIGS. 3 and 4 of the present embodiment. In other embodiments, the trailer front structure 120 can adjust its angle relative to the ground 300, and become tilted upwardly towards the pivot axis 132 when the trailer rear structure 140 is in the tilted position of FIG. 4. Alternatively or additionally, the suspension system 144 of the trailer wheels 142 can allow for a relative vertical displacement of the pivotable structure 150 with respect to the trailer wheels 142.

Figure 5:
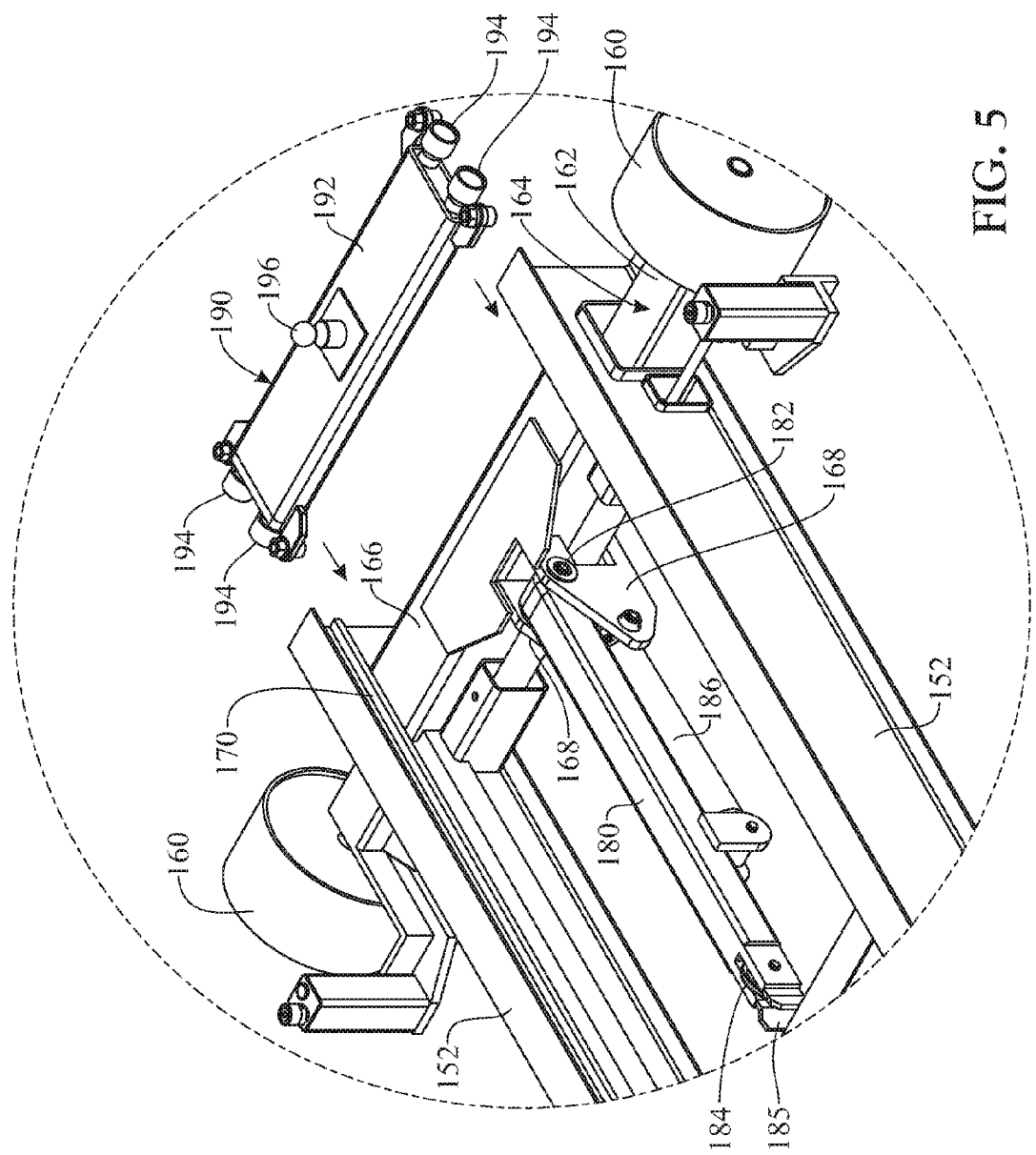
FIG. 5 presents an enlarged exploded perspective view of a rear portion of the trailer, more particularly illustrating typical rolling engagement of a carriage with the trailer rear structure, and a movable arm deployed in a lowered position.
Figure 6:
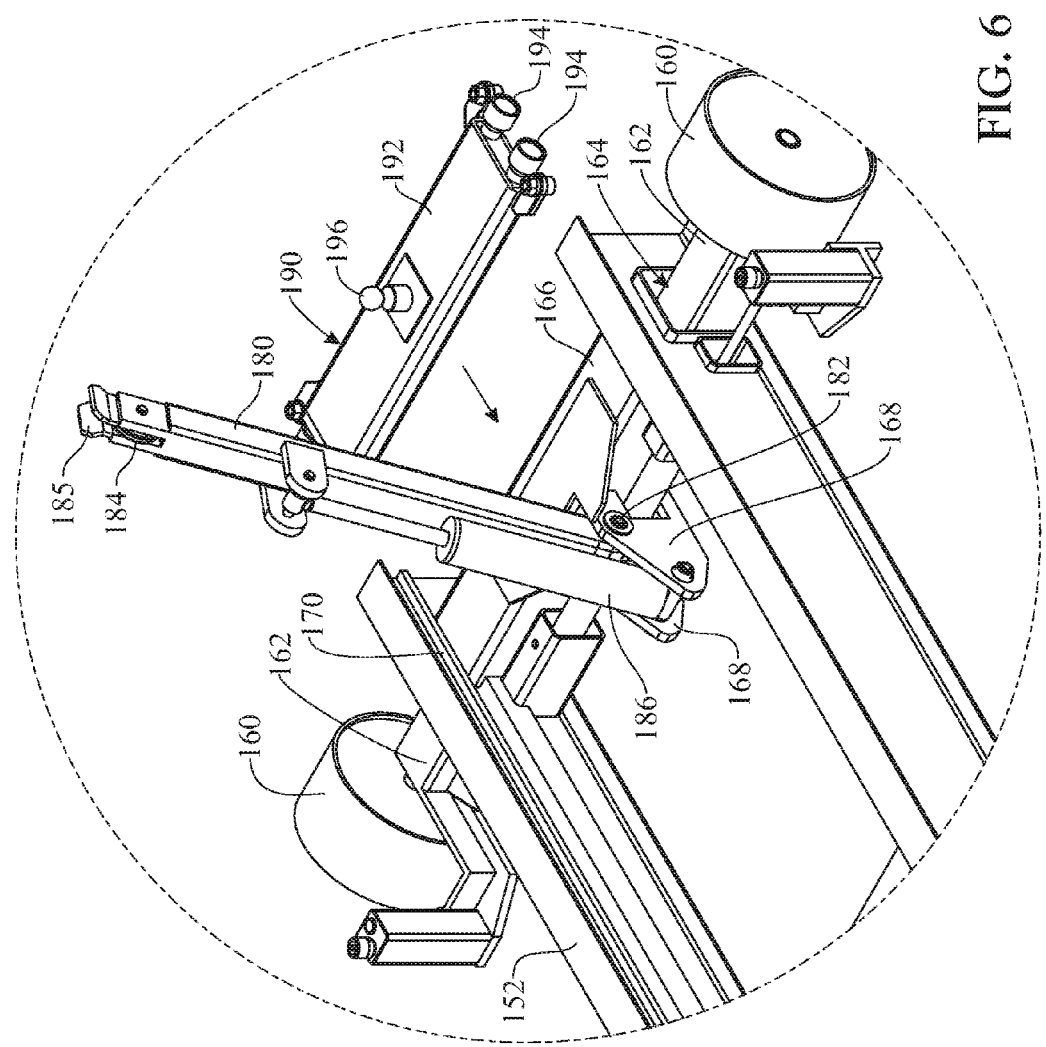
FIG. 6 presents an enlarged exploded perspective view of a rear portion of the trailer, more particularly illustrating typical rolling engagement of the carriage with the trailer rear structure, and the movable arm deployed in a raised position.

Turning to the illustrations of FIGS. 5 and 6, a movable arm 180 may be pivotally mounted on the trailer 110, and particularly, to the pivotable structure 150 of the trailer rear structure 140. For this purpose, the pivotable structure 150 includes an arm mount member 166, which may extend between the trailer rails 152 at a rear end of the trailer rear structure 140, the movable arm 180 being affixed to and supported by the arm mount member 166. In some embodiments, a pair of spaced-apart arm mount flanges 168 may extend forwardly from the arm mount member 166. The movable arm 180 may be pivotally mounted between the arm mount flanges 168 via an arm pivot point 182. Accordingly, the movable arm 180 may be pivotal between a lowered position such as that of FIG. 5 and a raised position such as that of FIG. 6, for purposes which will be hereinafter described. A pulley 184 and retainer 185 may be provided at the end of the movable arm 180; the retainer 185 can be a substantially U-shaped channel as shown in the drawings, or the like, for allowing a cable, chain, rope, cord or other flexible, windable elongated element (hereinafter referred to generally as cable) to slide therethrough and on the pulley 184 while transversely retaining the cable therein. A pneumatic, hydraulic or electric arm actuating cylinder 186 may be pivotally attached to the pivotable structure 150 and the movable arm 180; for instance, the arm actuating cylinder 186 of the present embodiment is pivotably attached to the arm mount flanges 168 of the pivotable structure 150 and to the movable arm 180. The arm actuating cylinder 186 can be operated to extend, retract and pivot by appropriate user operation of user-operable cylinder controls, which may be arranged on a wired or wireless console (not shown) in communication with the trailer 110 as known in the art. The arm actuating cylinder 186 may be selectively operable to pivot the movable arm 180 at the arm pivot point 182 and deploy the movable arm 180 in the lower position illustrated in FIG. 5 or in the raised position illustrated in FIG. 6 responsive to retraction and extension, respectively, of the arm actuating cylinder 186.

With continued reference to FIGS. 5 and 6, a carriage 190 is mounted for bidirectional travel on the trailer 110. For this purpose, the pivotable structure 150 of the trailer rear structure 140 of the present embodiment includes a pair of carriage roller channels, tracks or grooves 170 be provided in the respective trailer rails 152 of the pivotable structure 150 in facing relationship to each other. As illustrated in FIG. 5, the carriage 190 comprises a carriage body 192, which can be generally planar and rectangular. At least one carriage roller 194 may be provided on each end of the carriage 190, rotatably attached to the carriage body 192. Each carriage roller 194 may be sized and configured for insertion into the carriage roller groove 170 in the trailer rail 152 on the corresponding side of the pivotable structure 150 of the trailer rear structure 140. A carriage hitch 196 may be provided on the carriage 190 for purposes which will be hereinafter described. Preferably, the carriage hitch 196 is in longitudinally registration or alignment with the pivotable arm 180, as shown in the drawings.

Figure 2:
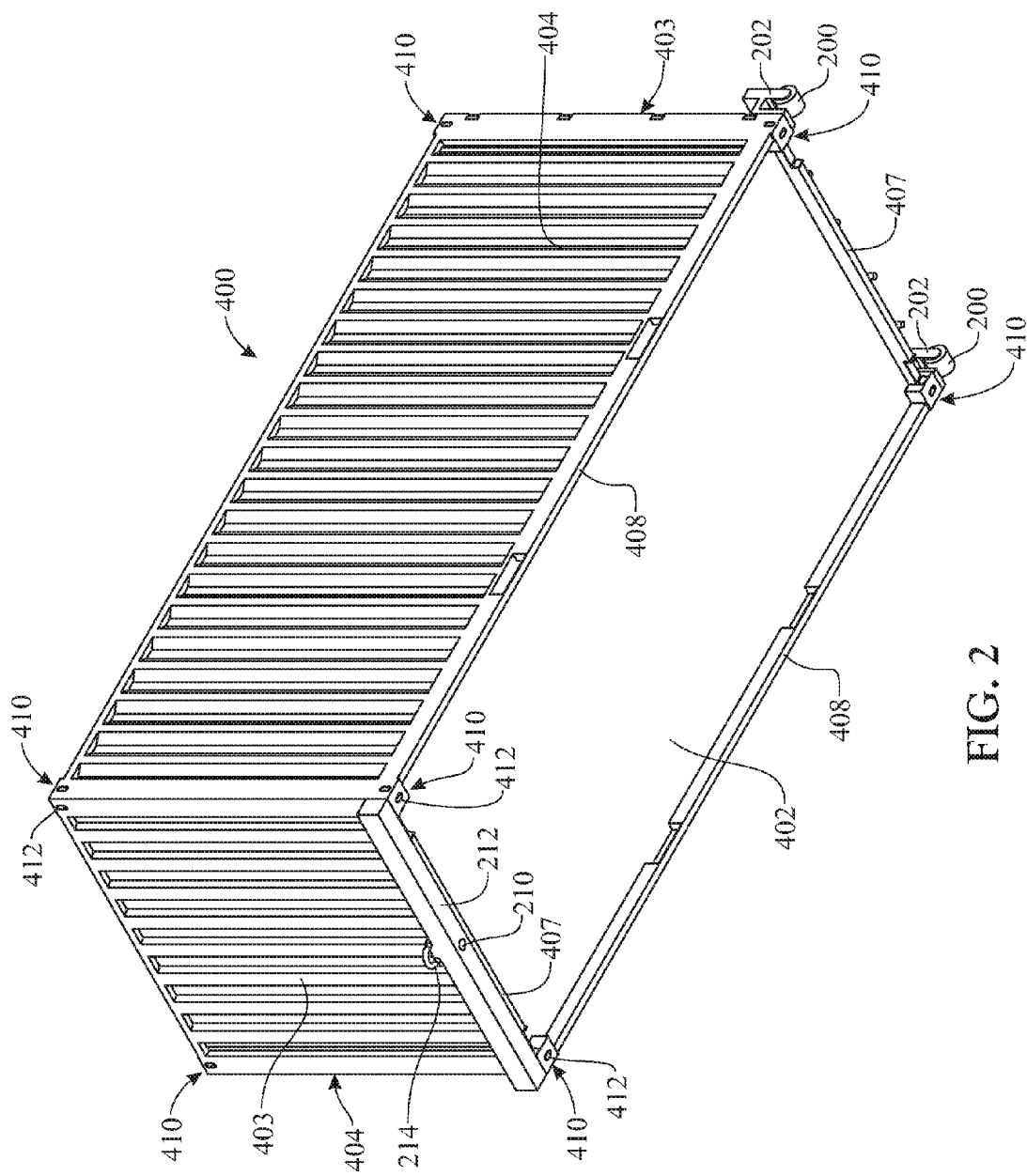
FIG. 2 presents a bottom perspective view of a typical cargo container which is suitable for implementation of the vehicle trailer system of the present invention.

The illustration of FIG. 2 presents a cargo container 400 as known in the art, which has been configured to be loaded onto the trailer 110 in accordance with the present invention. The cargo container 400 may include a cargo container floor 402. Multiple cargo container walls, such as two longitudinally opposed cargo container end walls 403 and two transversely opposed, cargo container side walls 404 may extend upwardly from the cargo container floor 402. A cargo container ceiling 406 (FIGS. 7-18) may be provided above the walls 403, 404. The walls 403, 404 include respective bottom edges or sides 407, 408 designed to support the cargo container 400 when left on the ground, in typical applications of the cargo container 400. The cargo container 400 may have at least one cargo container door (not illustrated) which facilitates loading and unloading of cargo (not illustrated) into and out of the cargo container 400. One of ordinary skill in the art will understand that many types of cargo containers may be utilized with the vehicle trailer system 100 of the present invention; these various cargo containers will not be described in detail so as not to obscure the invention. For instance, the cargo container 400 shown in FIG. 2 is known as an ISO container and includes eight ISO connectors 410, one at each respective corner of the cargo container 400. As known in the art, an ISO connector is a standardized container corner block, including an interior corner cavity and three contiguous access openings 412 that permit the attachment of fasteners for securing loading straps, chains or cables when loading and unloading containers, or fastening straps, chains or cables when securing containers for safe transportation, to name a few applications.

In order to adapt the cargo container 400 to be loaded by the vehicle trailer system 100 of the present embodiment, the vehicle trailer system 100 can further include a pair of cargo container rollers 200 that are attachable to a bottom rear end of the cargo container 400. For instance and without limitation, as shown in FIG. 2, each cargo container roller 200 of the present embodiment is rotatably supported by a roller structure 202, which is in turn securable to a bottom ISO connector 410 of the cargo container 400 by a nut and bolt (not shown). The illustration of FIG. 2 shows the exemplary pair of cargo container rollers 200 attached to the cargo container 400.

To further adapt the cargo container 400 for being loaded and unloaded by the vehicle trailer system 100 of the present embodiment, the vehicle trailer system 100 can also include a cargo container hitch coupler 210 that is attachable to a bottom front end of the cargo container 400. For instance and without limitation, as shown in FIG. 2, the cargo container hitch coupler 210 is a cavity or recess that is provided on a bottom side of a hitch structure 212 in the shape of an elongated beam. The recessed cargo container hitch coupler 210 is arranged substantially at the center of the hitch structure 212. The hitch structure 212 is in turn securable to opposed bottom front ISO connectors 410 of the cargo container 400 by the connection of a respective nut and bolt fastener or the like (not shown) to the front opening 412 of each opposite bottom front ISO connector 410. The illustration of FIG. 2 shows the exemplary hitch structure 212 and cargo container hitch coupler 210 attached to the cargo container 400. As illustrated in FIGS. 7-10 and will be hereinafter further described, the cargo container hitch coupler 210 is configured for coupling to the carriage hitch 196 on the carriage 190. In addition, the cargo container hitch coupler 210 may include a fastener 214 (e.g., a ring) that is welded or otherwise attached to the hitch structure 212; in other embodiments, the cargo container hitch coupler 210 may include any other type of mechanical component to which a hook, a self-closing hook, or the like can be coupled. The fastener 214 of the present embodiment is arranged also at the center of the hitch structure 212, in longitudinal registration with the cargo container hitch coupler 210 if the cargo container 400 is observed in top plan view. The fastener 214 and the hitch structure 212 can also be arranged substantially in vertical registration, such as in the present embodiment.

In some embodiments, the carriage hitch 196 on the carriage 190 may include a hitch ball to facilitate a ball joint connection between the carriage 190 and the hitch structure 212 that allows pivoting of the cargo container hitch structure 212 (FIG. 2) affixed to the cargo container 400 within a horizontal plane. Thus, the ball-joint connection between the carriage hitch 196 permits the cargo container 400 to rotate horizontally with respect to the carriage 190, and therefore, be able to facilitate loading of the cargo container 400 onto the trailer 110 in the event that the cargo container hitch coupler 210 is not initially precisely aligned with the carriage hitch 196. Preferably, the ball joint connection is arranged higher than adjacent portions of the trailer rails 152 so that the cargo container 400 does not rest on the trailer rails 152 when coupled to the ball joint connection, thus allowing the cargo container 400 to rotate horizontally without the trailer rails 152 frictionally interfering with the rotation. Additionally, the ball-joint connection between the carriage hitch 196 and the cargo container hitch coupler 210 may allow the container hitch structure 212 and the cargo container 400 to slightly pivot vertically, i.e., may present a vertical tolerance which renders the joint between the trailer 110 and the cargo container 400 more resistant, durable and versatile.

The illustrations of FIGS. 7-15 present a typical application of the vehicle trailer system 100, and more particularly, a sequence of steps for loading a cargo container 400 onto the trailer 110 of the vehicle trailer system 100.

Initially, the trailer front structure 120 of the trailer 110 is coupled to a towing vehicle (not illustrated) via the trailer hitch coupler 126. Then, as shown in FIG. 7, the trailer 110 is brought near the cargo container 400 and the pivotable structure 150 is operated to rotate in a downward direction so that the pivotable structure 150 becomes oriented in the rearwardly-sloped or angled loading position illustrated in FIG. 4, with the trailer rollers 160 resting on the ground 300. The cargo container 400 rests on the ground 300 behind the trailer 110.

Figure 16:
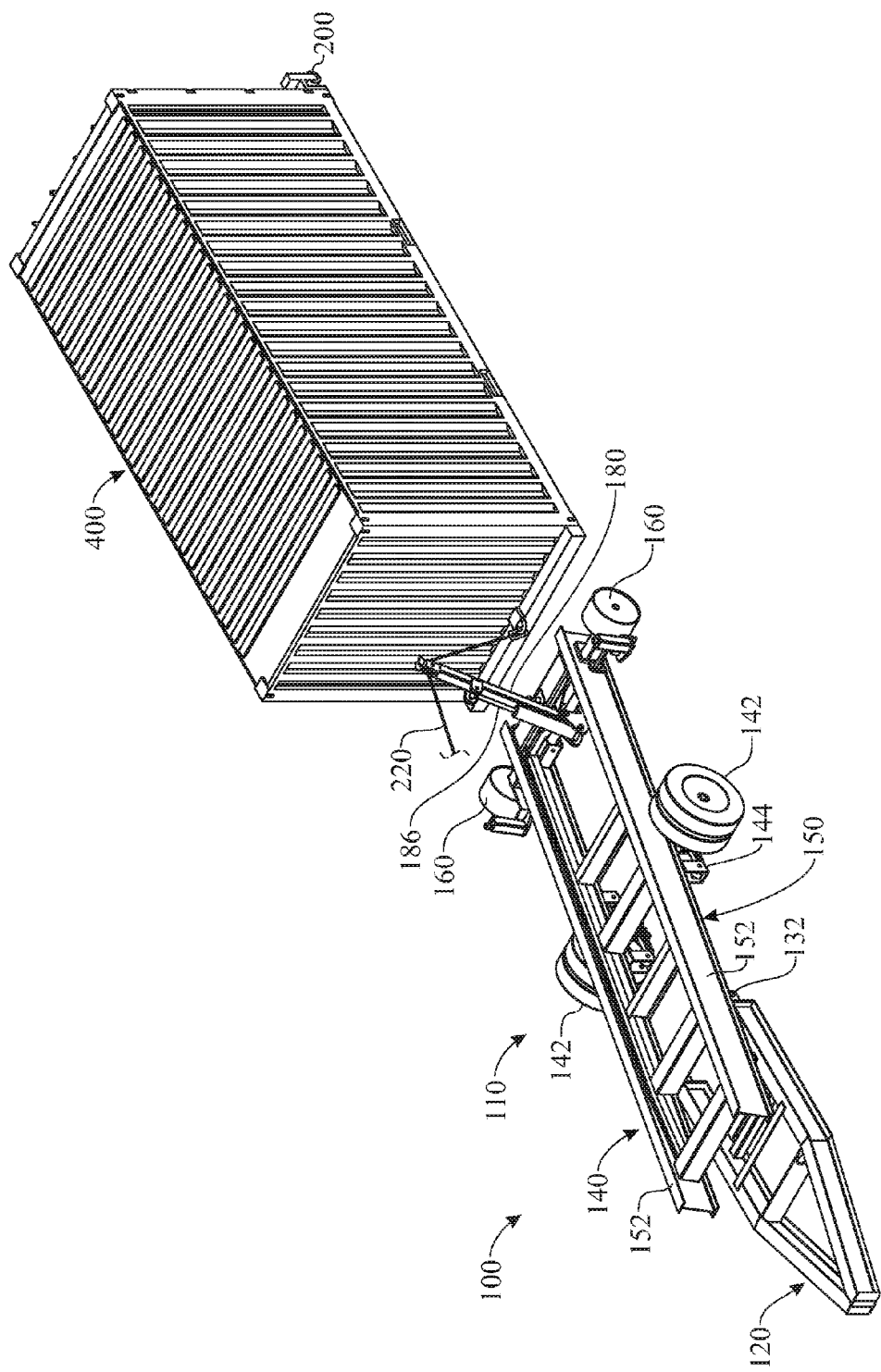
FIG. 16 presents a front perspective view of the vehicle trailer system in the position of FIG. 7.
Figure 17:
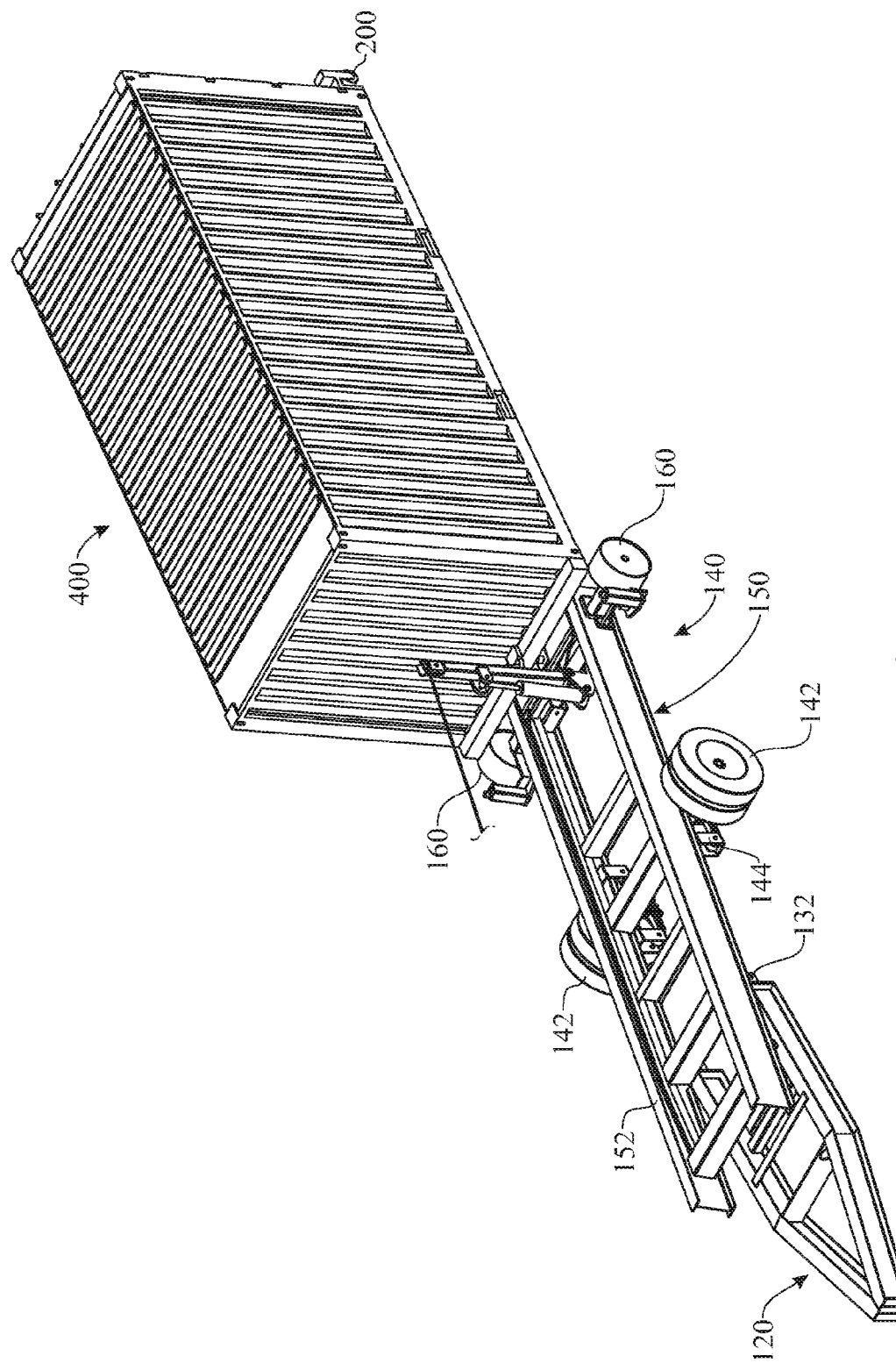
FIG. 17 presents a front perspective view of the vehicle trailer system in the position of FIG. 9.
Figure 18:
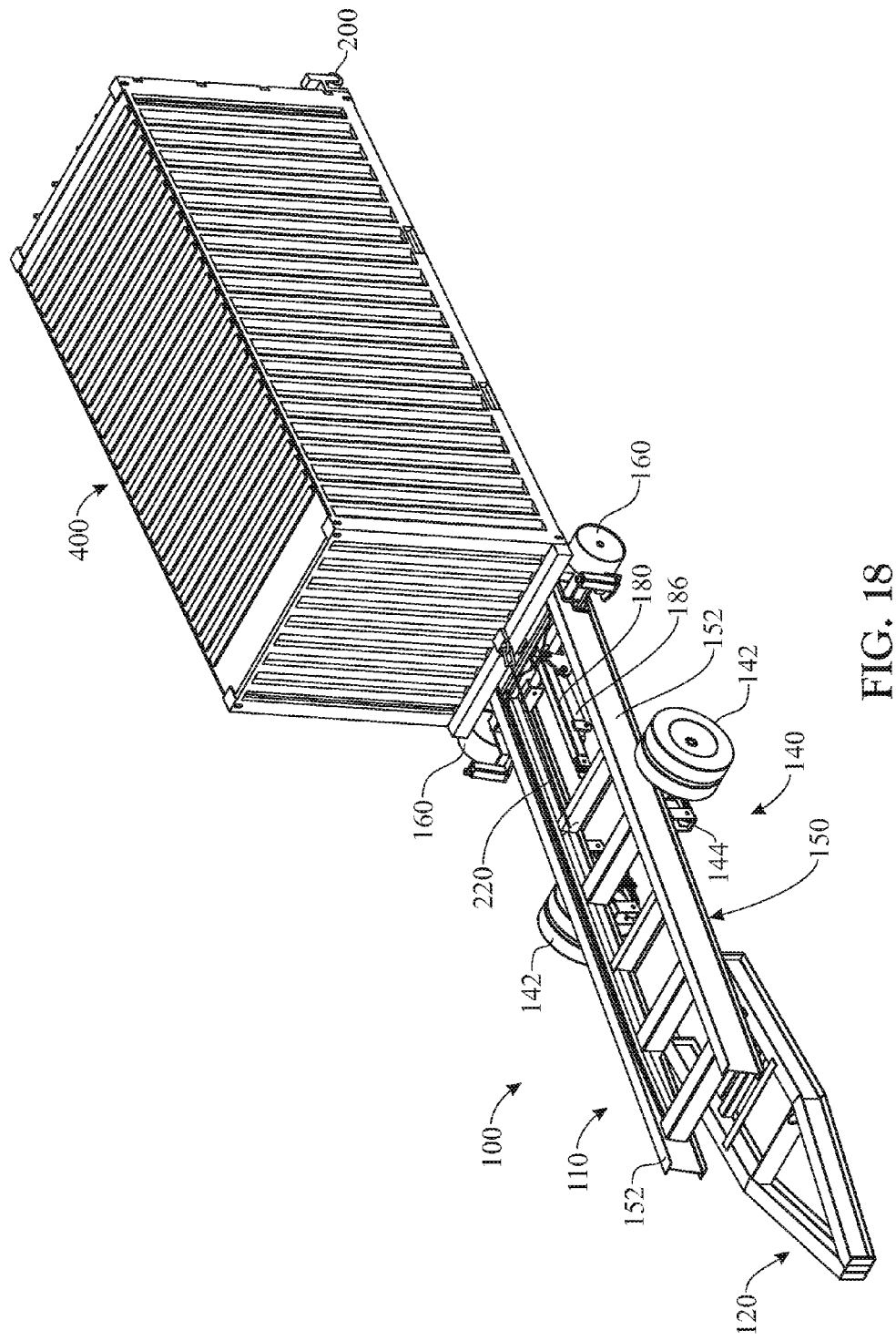
FIG. 18 presents a front perspective view of the vehicle trailer system in the position of FIG. 10.

As further illustrated in FIG. 7 and in the matching perspective view of FIG. 16, a winch cable 220 is initially unwound and extended from a winch (not illustrated). The term winch cable 220 is used generally to refer to any flexible, windable elongated element capable of being wound on a winch and pulling the required load weight for instance and without limitation, the term winch cable can include a metallic cable, a wire, a chain, a cord, or the like. The winch can be provided on the trailer front structure 120; in other embodiments, the winch can be provided on the towing vehicle. The winch can be operated to rotate in a winding direction or an unwinding direction, and stopped by appropriate user operation of user-operable winch controls, which may be arranged in the same console as the user-operable cylinder controls for operating the arm actuating cylinder 186. The arm actuating cylinder 186 is actuated to raise the movable arm 180 from the lowered position (FIG. 5) to the raised position (FIG. 6) until the movable arm 180 angles slightly rearwardly (with respect to a vertical orientation) toward the cargo container 400. The winch cable 220 is then extended over and onto the pulley 184 on the movable arm 180, and a hook 222 at the end of the winch cable 220 is attached to the fastener 214 on the hitch structure 212 as the cargo container 400 initially rests flat on the ground 300. Alternatively, the winch cable 220 may have been extended, and the hook 222 attached to the fastener 214, prior to raising the movable arm 180; if so, the raising movable arm 180 eventually engages with the winch cable 220 and equally reaches the position of FIGS. 7 and 16.

As illustrated in FIG. 8, the winch (not illustrated) is then operated to wind the winch cable 220 typically in the conventional manner. Pulled by the winch, the winch cable 220 rides on the pulley 184 on the movable arm 180 and lifts the front end of the cargo container 400 from the ground 300.

The lifting effect produced by the winch cable 220 hanging from the pulley 184, in combination with the fact that, once lifted, the cargo container 400 is supported on the rear cargo container rollers 200, provides a significant advantageous effect which can be observed in FIGS. 19 and 20. Attention is directed to FIG. 19, which shows an initial situation similar to that of FIGS. 7 and 16, but slightly different in that the cargo container 400 is not initially aligned with the vehicle trailer system 100, but rather offset from a central vertical longitudinal plane 156 of the vehicle trailer system 100 and more particularly of the pivotable assembly 150 (the movable arm 180 and pulley 184 being on this central vertical longitudinal plane 156). When the winch is operated to cause the winch cable 220 and hook 222 to pull on the fastener 214 attached to the cargo container 400, as in FIGS. 7 and 8, the front end of the cargo container 400 is lifted while the rear end of the cargo container 400 is supported on the ground by the cargo container rollers 200. Now, because the hook 222 and fastener 214 are offset from the central vertical longitudinal plane 156 as shown in FIG. 19, when the cargo container 400 starts to rise, the winch cable 220 exerts a transverse force, i.e. in the direction of arrow A or having a component in the direction of arrow A, on the fastener 214. Thus, as soon as the front end of the cargo container 400 lifts off the ground, the unaligned, suspended front end of the cargo container 400 will tend to rotate towards the central vertical longitudinal plane 156 due to gravity and assisted by the rear cargo container rollers 200. Continued operation of the winch and continued exertion of the transverse force causes the front end of the cargo container 400 to continue rotating towards the pulley 184 while the rear end can adjust its position by rolling on the cargo container rollers 200. Eventually, the cargo container 400 reaches a position in which the fastener 214, and thus the front end of the cargo container 400, has self-aligned with the movable arm 180 as reflected in FIG. 20. Thus, the front lifting of the cargo container 400 from a winch cable 220 or other flexible elongated item (e.g., a chain) combined with one or more rear bottom rollers attached to the cargo container 400 provide an automatic alignment correction of the cargo container 400 when lifted.

Referring back to the sequence of FIGS. 7-15, and particularly to FIG. 8, operation of the winch once the front end of the cargo container 400 has been lifted from the ground 300 causes the cargo container 400 to move forward towards the trailer 110 by means of the cargo container rollers 200, while the front end of the cargo container 400 is moved upward by the winch cable 220 pulling the fastener 214. The shortening winch cable 220 continues to pull the cargo container 400 toward the trailer 110 as the cargo container rollers 200 roll on the ground 300.

Figure 11:
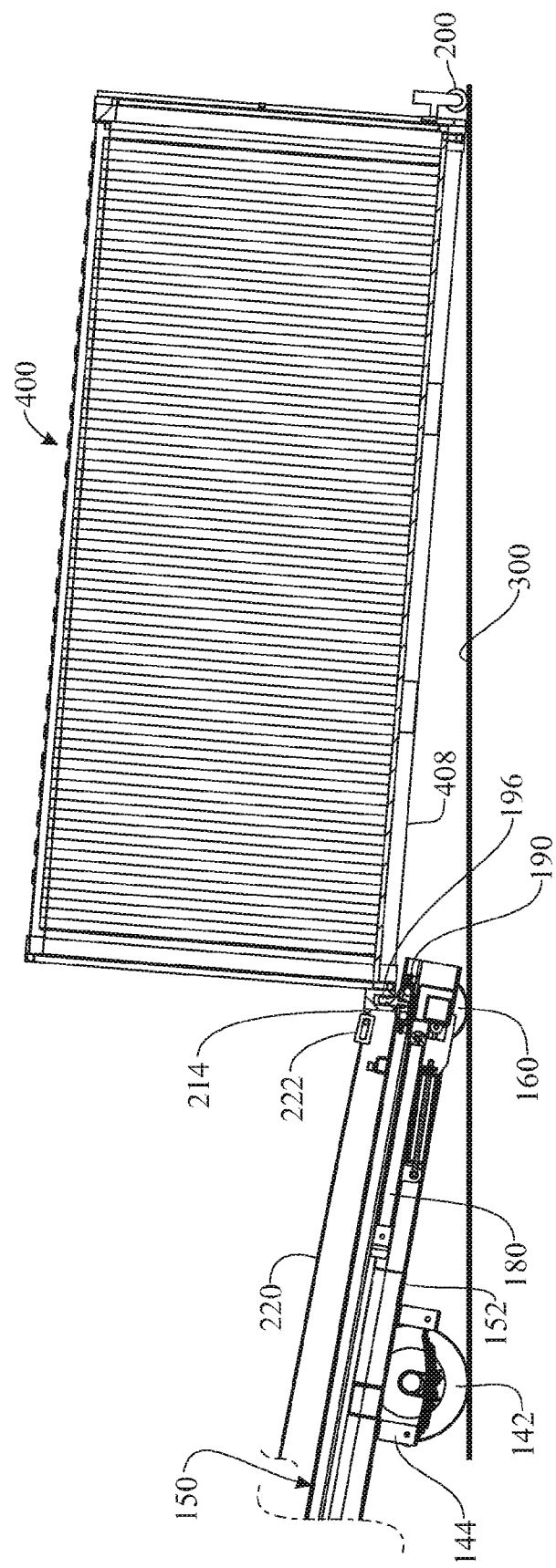
FIG. 11 presents a cross-sectional side elevation view of the vehicle trailer system illustrating the cargo container in a lowermost position on the trailer as loading of the cargo container onto the trailer commences.

As the winch cable 220 continues to shorten, the cargo container hitch coupler 210 on the cargo container 400 eventually becomes disposed above and in vertical alignment with the carriage hitch 196 on the carriage 190. At that point, the movable arm 180 is deployed in a vertical or approximately vertical position for more robustly supporting the load. From this vertical position, the winch may be operated to slightly lengthen the winch cable 220 such that the front end of the cargo container 400 drops and the cargo container hitch coupler 210 receives the underlying carriage hitch 196 to couple the cargo container 400 to the carriage 190, as illustrated in FIG. 9 and in the matching perspective view of FIG. 17. Once the cargo container 400 is coupled to the carriage 190, the arm actuating cylinder 186 is operated as shown in FIG. 10, i.e. to lower the movable arm 180 towards the lowered position of FIG. 5. Eventually, the movable arm 180 disengages from the winch cable 220 and reaches the folded position described with reference to FIG. 4, as illustrated in FIG. 11 and in the matching perspective view of FIG. 18.

Figure 12:
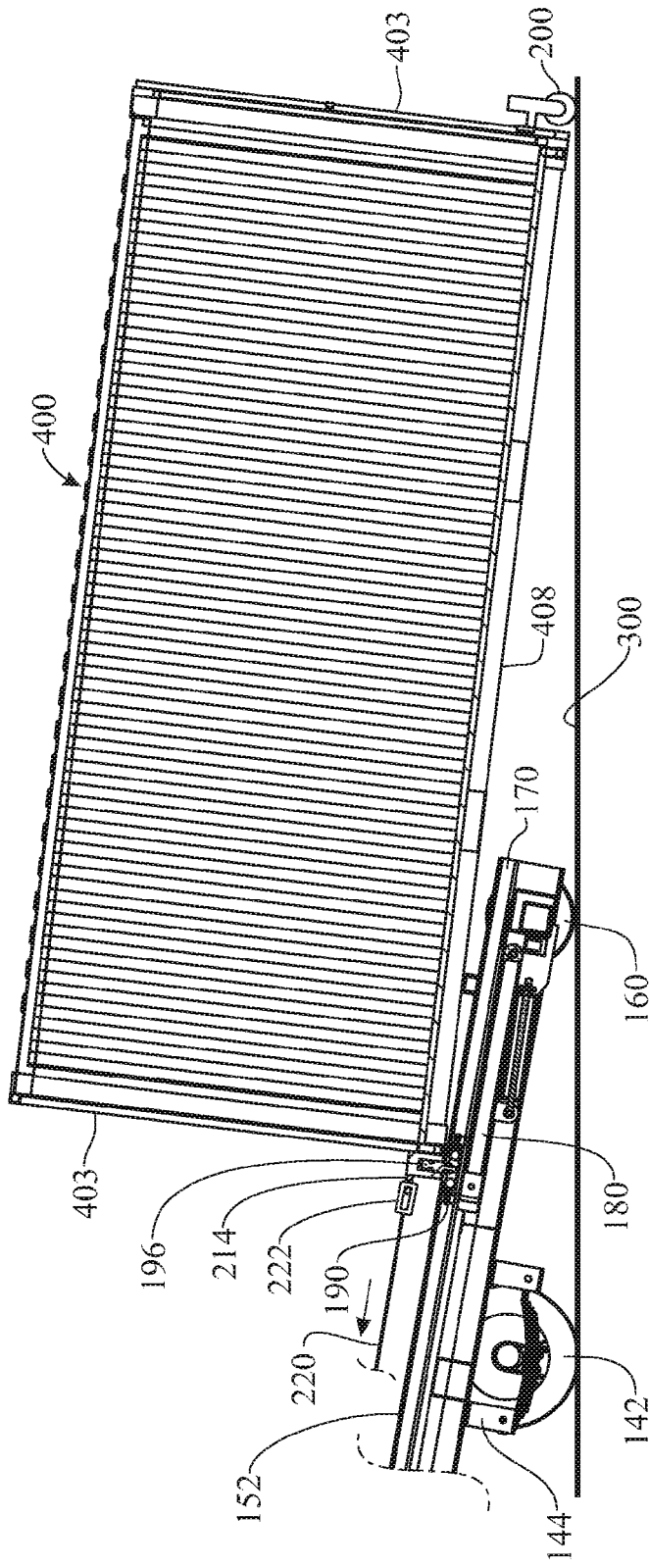
FIG. 12 presents a cross-sectional side elevation view of the vehicle trailer system as loading of the cargo container onto the trailer continues and the carriage passes over the lowered movable arm.
Figure 13:
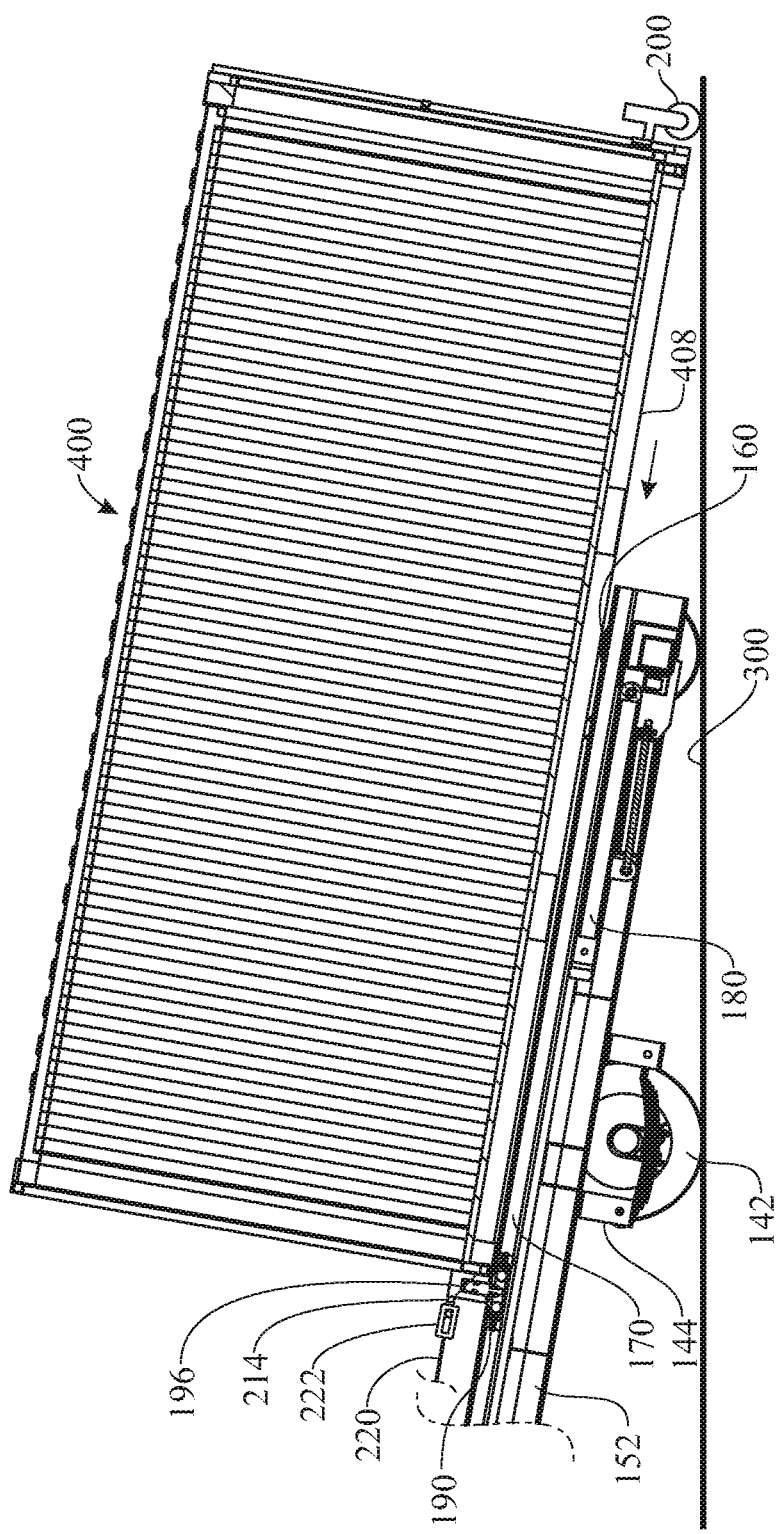
FIG. 13 presents a cross-sectional side elevation view of the vehicle trailer system with the cargo container loaded more than halfway onto the trailer, and the cargo container coming into contact with the trailer rollers.
Figure 14:
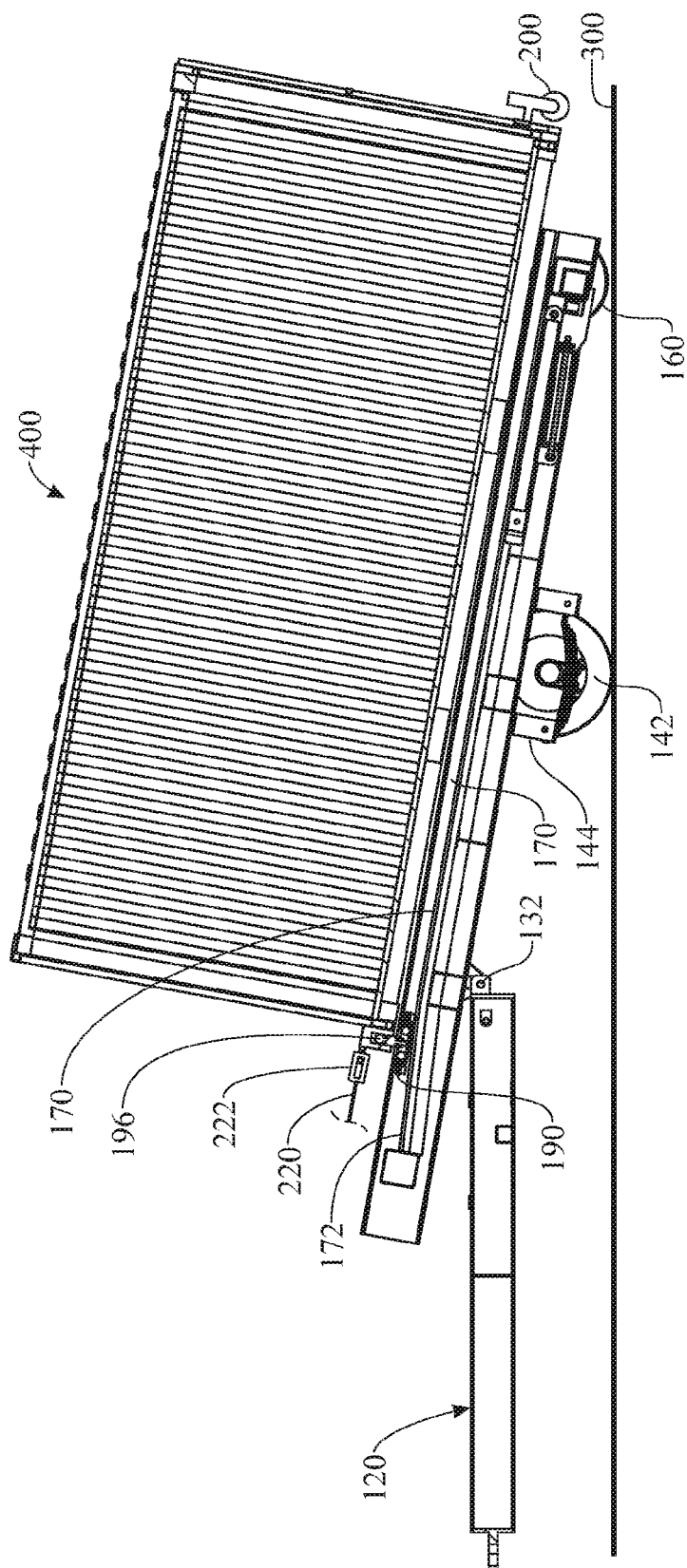
FIG. 14 presents a detailed side view of the vehicle trailer system with the cargo container almost completely loaded onto the trailer, reflecting the cargo container being supported by the carriage hitch and the trailer rollers.

As illustrated in FIGS. 12-14, continued operation of the winch causes the winding winch cable 220 to progressively pull the cargo container 400 up the trailer rear structure 140 and cause the carriage 190 to travel forwardly in the carriage roller grooves 170 arranged on the inner facing sides of the trailer rails 152. As best shown in FIG. 12, the movable arm 180 in the lowered position is arranged below the carriage 190, permitting the carriage 190 to pass over the lowered movable arm 180. As further shown in FIG. 12, the upward and forward moving cargo container 400 is supported on the cargo container rollers 200 and on the carriage hitch 196 (and thus on the carriage 190). Since the carriage hitch 196 provides an articulated connection of the cargo container 400 about a vertical axis, the container can gradually align with the winch cable 220 and carriage high 196 as it is pulled upward.

As shown in FIG. 13, continued operation of the winch eventually causes the bottom sides 408 of the cargo container side walls 404 to contact the trailer rollers 160. At this point, the cargo container 400 is being supported on the cargo container rollers 200, the carriage hitch 196 and the trailer rollers 160. From this point, continued operation of the winch causes the cargo container rollers 200 to lift off the ground 300, and the cargo container 400 to be loaded onto the pivotable structure 150 of the trailer rear structure 140 while supported on the trailer rollers 160 and the carriage hitch 196.

As illustrated in FIG. 14, continued operation of the winch eventually causes the center of gravity of the cargo container 400 to pass the trailer wheels 142, which act as a fulcrum for the trailer 110. At that point, the pivotable structure 150 of the trailer rear structure 140 starts pivoting from the loading position of FIG. 4 to the transport position of FIG. 3, as the front end of the pivotable structure 150 starts to fall and pivot downwardly with respect to the trailer front structure 120 about the pivot axis 132, and the rear end of the pivotable structure 150 begins to rise and the trailer rollers 160 are lifted off from the ground 300. In addition, the carriage rollers 194 enter and begin to roll along a downward section 172 of the carriage roller grooves 170, causing the cargo container 400 to be displaced vertically downward with respect to the trailer rails 152.

Figure 15:
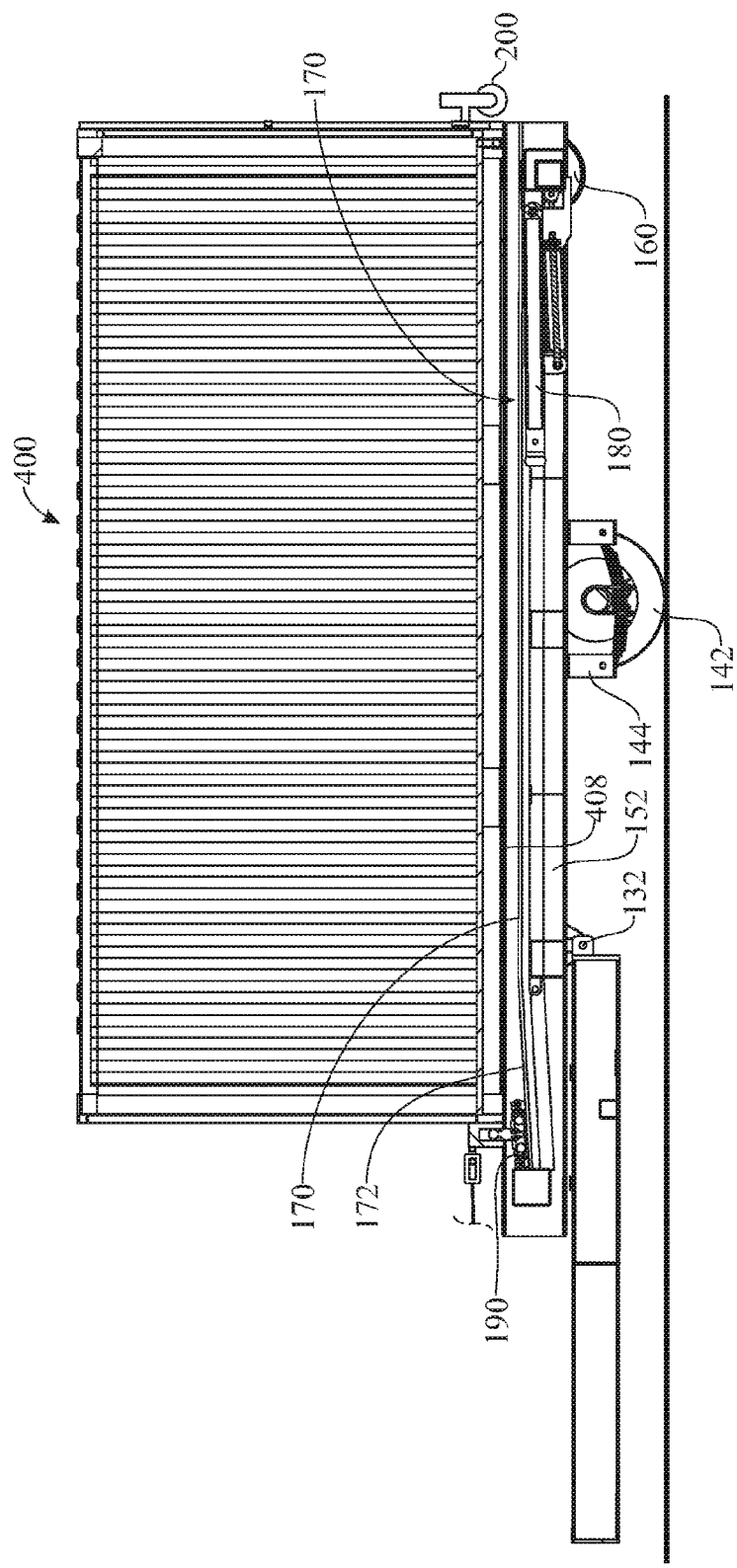
FIG. 15 presents a detailed side view of the vehicle trailer system with the cargo container completely loaded onto the trailer and the trailer deployed in the container transporting configuration.

Further operation of the winch brings the cargo container 400 to a final position shown in FIG. 15. In this final position, the trailer 110 has adopted the transport position of FIG. 3. As shown, the trailer rollers 160 are at a topmost raised position. In addition, the carriage 190 has rolled along the downward section 172 of the carriage roller grooves 170 to a final position in which the carriage 190 is sufficiently displaced downward to allow the front bottom side 407 of the cargo container 400 to rest on the trailer rails 152. Thus, in this final position, the cargo container 400 is supported by the trailer rails 152 and the trailer rollers 160. In this final or fully-loaded position, the cargo container 400 is securely supported by the trailer 110 and can be transported by the towing vehicle and the vehicle trailer system 100.

Unloading of the cargo container 400 can be easily carried out by operating the pivotable structure 150 to pivot rearward, toward the loading position of FIG. 4. When the pivotable structure 150 acquires a slight but sufficient tilt, the carriage 190 cargo container 400 begins to roll rearward due to gravity. The winch and winch cable 220 retain the cargo container 400 so that it slowly, controlledly and safely descends along the pivotable structure 150, following a sequence that is generally reverse to the loading sequence described heretofore.

In summary, the vehicle trailer system 100 replaces an entire container-dragging process, as taught in prior art, with a container-lifting and loading process in which the cargo container 400 is initially vertically lifted and coupled to the trailer 110 (to the carriage hitch 196) in an initial semi-loaded position (FIG. 9), thereby reducing the length of the trailer 110 needed to achieve this initial semi-loaded position in comparison to container-dragging trailers known in the art. In addition, by having the cargo container 400 first lifted and then coupled while supported by the rear cargo container rollers 200 and the carriage hitch 196 (FIGS. 9 to 13), and then supported by the trailer rollers 160 and the carriage hitch 196 (FIGS. 13-14), and only finally supported by flat, upper surfaces of the trailer rails 152 (FIG. 15), loading of the cargo container 400 onto the trailer 110 is carried out with minimum friction between the cargo container 400 and the trailer 110 in comparison to conventional trailers in which the cargo container is dragged onto a trailer bed.

While the vehicle trailer system 100 described heretofore is such that the cargo container 400 in its final, loaded position rests on the trailer rails 152, alternative embodiments are contemplated in which the cargo container 400 may not rest on trailer rails.

Figure 21:
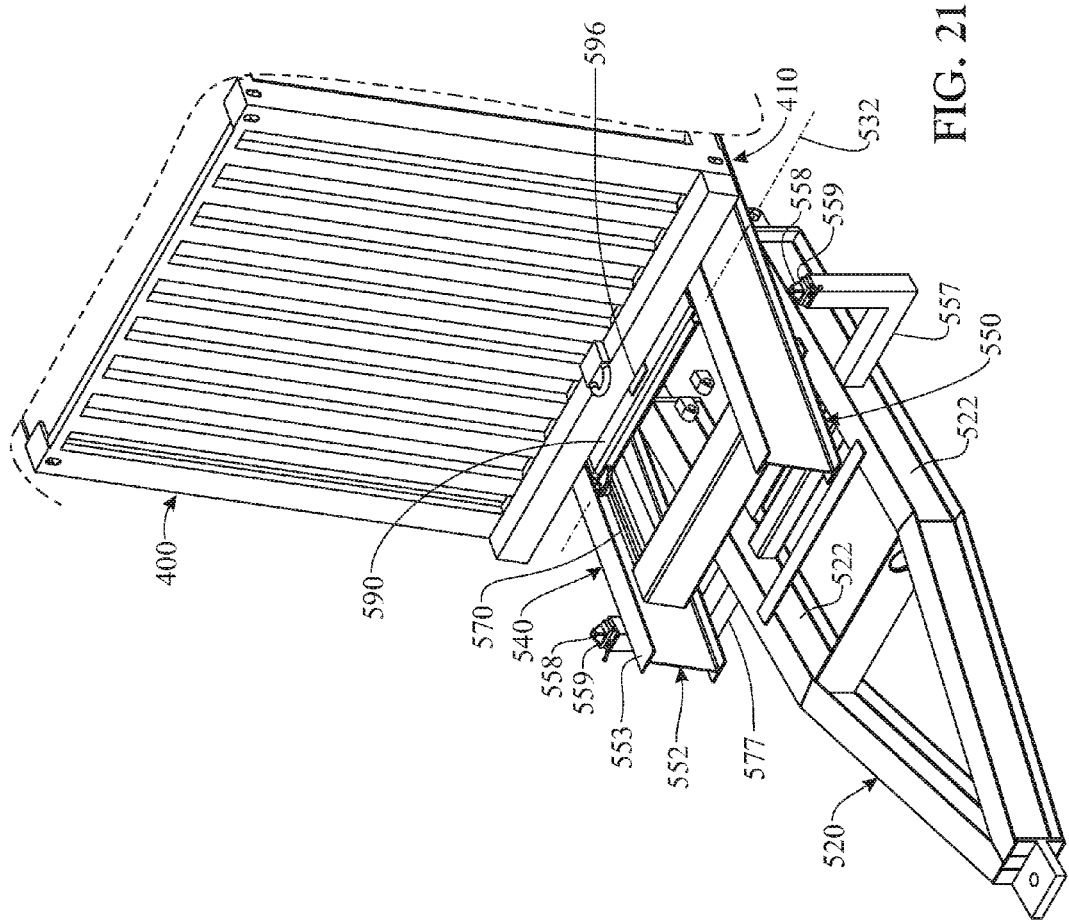
FIG. 21 presents a partial isometric front view of a second exemplary embodiment of a vehicle trailer system in accordance with the invention, including two opposite side connector locks, the vehicle trailer system shown in a first position in which the cargo container is being pulled onto the trailer rear structure.
Figure 22:
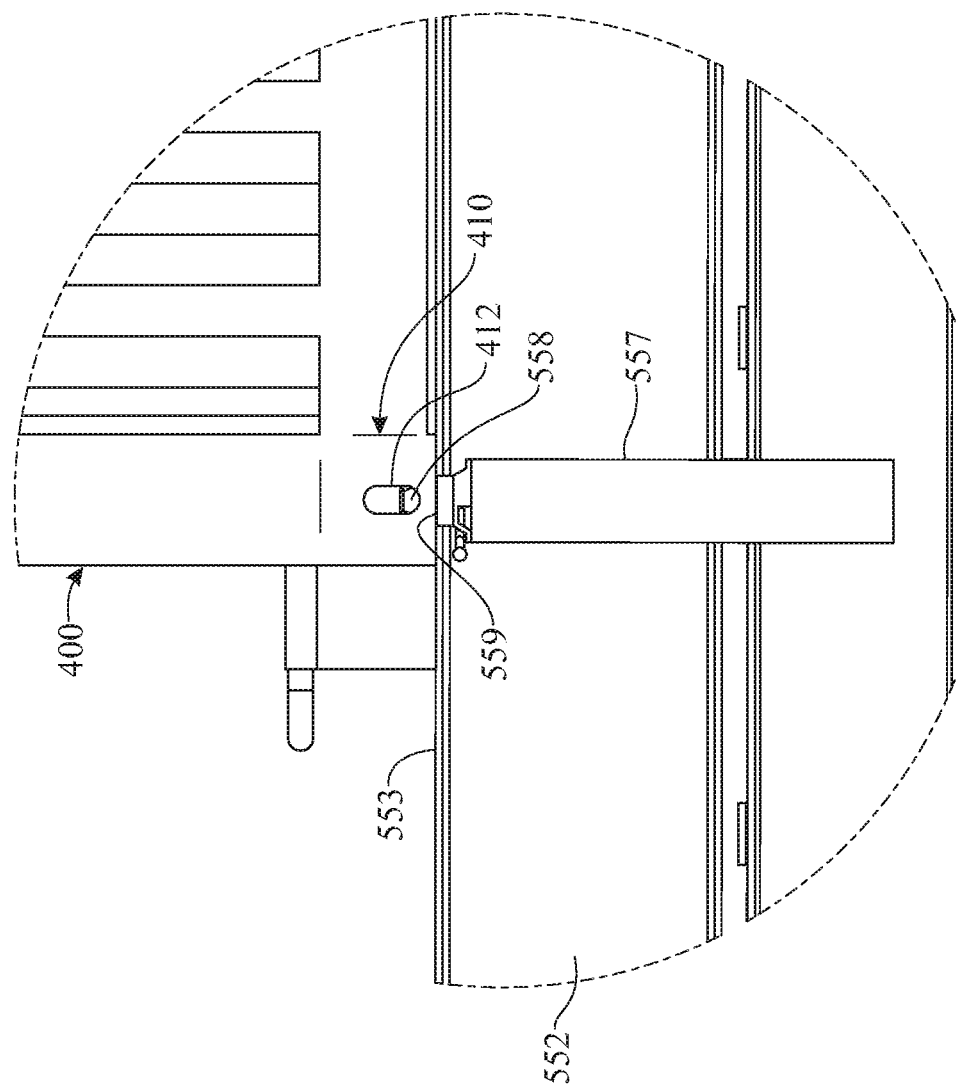
FIG. 22 presents an enlarged side elevation view of the vehicle trailer system of FIG. 21, showing the cargo container in a final position in which a corner connector of the cargo container is coupled onto, and supported by, a connector lock.

For instance, a vehicle trailer system 500 in accordance with a second exemplary embodiment of the invention is depicted in FIGS. 21 and 22. Like features of the vehicle trailer system 500 and the vehicle trailer system 100 (FIGS. 1 through 20) are numbered the same except preceded by the numeral '5'. As shown, the vehicle trailer system 500 comprises a trailer front structure 520 for attachment to a towing vehicle, a wheeled trailer rear structure 540 carried by the trailer front structure 520, the trailer rear structure 540 comprising a pivotable structure 550 pivotably attached to the trailer front structure 520 and supported on the ground by at least one pair of trailer wheels (not shown, but can be the same as those included in the first exemplary embodiment). Similarly to the previous embodiment, a carriage 590 is mounted for bidirectional travel on the pivotable structure 550, and a carriage hitch 596 is carried by the carriage 590, the carriage hitch 596 being configured for coupling to the load (e.g., cargo container 400). A movable arm (not shown, but for instance identical to that of the previous embodiment) is pivotally carried by the trailer rear structure 540, the movable arm being operable to selectively position the movable arm in a lowered position in which the carriage 590 can travel over the movable arm, and in raised positions in which the movable arm is elevated over the carriage 590. In addition, similarly to the previous embodiment, the pivotable structure 550 comprises two trailer rails 552 including a respective carriage roller groove 570.

However, unlike the previous embodiment, in which the carriage roller grooves 170 ended in downward sections 172, the carriage roller grooves 570 of the present embodiment are parallel to an upper surface 553 of the trailer rails 552 and do not end in a downward section. In turn, in addition, the present embodiment includes two opposed side wings 557 ending in top end connectors 558. The top end connectors 558 are configured to engage into a bottom opening of a corner connector of a cargo container, such as into each bottom front opening 412 of the front ISO connectors 410 of the cargo container 400 of FIG. 2. The side wings 557 are attached to, and protrude outwardly from, the trailer front structure 520, and in particular from two opposed side frame members 522 of the trailer front structure 520. Each top end connector 558 comprises an upward-facing, preferably horizontal shoulder surface 559.

In a loading operation, as understood by FIGS. 21 and 22, when the cargo container 400 is pulled and rolled sufficiently onto the pivotable structure 550 and the pivotable structure 550 pivots forwardly to recover the horizontal position (similarly to FIG. 3), the cargo container 400 pivots downwardly in such a way that the bottom openings 412 of the front bottom ISO connectors 410 engage with the top end connectors 558, as shown in FIG. 22, and the cargo container 400 rests on the shoulder surfaces 559 and/or on the upper surfaces 553 of the trailer rails 552 (in dependence of which is arranged higher in each specific embodiment of the invention). For instance, in the present embodiment, the shoulder surfaces 559 are arranged slightly above the upper surfaces 553 of the trailer rails 552, and the cargo container 400 therefore does not rest on the upper surfaces 553 of the trailer rails 552 but on the shoulder surfaces 559. Thus, the cargo container 400 reaches a final, transport position in which it is supported on its front bottom ISO connectors 410, and longitudinally and transversely locked in place by, the male-female coupling of the top end connectors 558 and the respective front bottom ISO connectors 410. Coupling of the front bottom ISO connectors 410 to the top end connectors 558 of the vehicle trailer system secures the cargo container 400 longitudinally and contributes to safety during transportation.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle trailer system for loading, transporting and unloading a load, the vehicle trailer system comprising:
   a trailer, arranged along a front-to-back, longitudinal direction, the trailer comprising:
      a wheeled trailer structure for attachment to a towing vehicle;
      a carriage mounted on the trailer structure for bidirectional travel along the trailer structure and along the longitudinal direction;
      a carriage hitch carried by the carriage, the carriage hitch configured for coupling to a load;
      a movable arm carried by the trailer structure;
      an arm actuator carried by the trailer structure and operably engaging the movable arm to move the movable arm; and
      a flexible, windable elongated element comprising a fastener for coupling to and pulling the load; wherein the vehicle trailer system is configured to adopt;
         a first configuration, in which the carriage is mounted on the trailer structure and the movable arm is positioned in a raised position extending over said carriage and rearward of said carriage hitch, and further in which the flexible, windable elongated element is supported on and suspended from the movable arm and the fastener extends rearward of the carriage hitch for the coupling of the fastener to a load and the pulling and lifting of the load by the flexible, windable elongated element onto the carriage hitch;
         a second configuration, in which the movable arm is lowered relative to the raised position, and further in which the carriage is traveling frontward on and along the trailer structure and passing over the movable arm; and
         a third configuration, in which the carriage is arranged frontward of the movable arm, and the movable arm is lowered relative to the raised position for the passing of a load thereover as pulled by the elongated, windable element.

2. The vehicle trailer of claim 1, wherein the movable arm is pivotable about a side-to-side, transverse rotation axis and along a vertical longitudinal plane which is longitudinally aligned with the carriage hitch.

3. The vehicle trailer of claim 1, wherein the wheeled trailer structure comprises:
   a trailer front structure for attachment to the towing vehicle;
   a trailer rear structure, pivotably attached to the trailer front structure about a side-to-side, transverse pivot axis.

4. The vehicle trailer system of claim 3, wherein the movable arm is pivotably carried by the trailer rear structure.

5. The vehicle trailer system of claim 3, wherein the trailer rear structure comprises a pivotable structure pivotably attached to the trailer front structure and supported on the ground by at least one pair of wheels.

6. The vehicle trailer system of claim 5, wherein the pivotable structure of the trailer rear structure comprises a pair of spaced-apart trailer rails and the carriage is translationally mounted on the trailer rails.

7. The vehicle trailer system of claim 6, wherein the carriage is arranged between the trailer rails.

8. The vehicle trailer system of claim 1, wherein the carriage hitch comprises a hitch ball providing a ball-joint coupling with the load.

9. The vehicle trailer system of claim 8, wherein the ball-joint coupling is arranged vertically higher than adjacent portions of the trailer structure.

10. The vehicle trailer system of claim 1, further comprising at least one roller attachable to the load.

11. The vehicle trailer system of claim 1, further comprising a hitch structure removably attachable to the load, the hitch structure comprising a hitch coupler for engaging with the carriage hitch, the hitch structure further comprising a fastener for coupling the fastener of the flexible, windable elongated element.

12. The vehicle trailer system of claim 1, wherein the movable arm further comprises a retainer transversely retaining the flexible, windable elongated element within the arm when the flexible, windable elongated element is supported by the movable arm.

13. The vehicle trailer system of claim 1, wherein the movable arm comprises at least one pulley from which the flexible, windable elongated element is suspended in at least one of the plurality of raised positions.

14. The vehicle trailer system of claim 1, wherein the trailer structure further comprises at least one trailer roller arranged at a rear end of the trailer structure, the at least one trailer roller rotatable about a side-to-side, transverse rotational axis for the longitudinal rolling thereon of the load.

15. The vehicle trailer system of claim 14, the at least one trailer roller comprising two trailer rollers arranged on opposite sides of a rear end of the trailer structure.

16. A vehicle trailer system for loading, transporting and unloading a load, the vehicle trailer system comprising:
   a trailer, arranged along a front-to-back, longitudinal direction, the trailer comprising:
      a trailer front structure for attachment to a towing vehicle;
      a wheeled, trailer rear structure, pivotably attached to the trailer front structure about a side-to-side, transverse pivot axis;
      a carriage mounted on the trailer rear structure for bidirectional travel along the trailer rear structure and along the longitudinal direction;
      a carriage hitch carried by the carriage, the carriage hitch configured for coupling to the load;
      a movable arm pivotably carried by the trailer rear structure; and
      an arm actuator operably engaging the movable arm to pivot the movable arm; wherein
   the vehicle trailer system is configured to adopt:
      a first configuration, in which the carriage is mounted on the trailer rear structure and the movable arm is positioned in a raised position extending over said carriage and rearward of said carriage hitch;
      a second configuration, in which the movable arm is lowered relative to the raised position, and further in which the carriage is traveling frontward on and along the trailer rear structure and passing over the movable arm; and
      a third configuration, in which the carriage is arranged frontward of the movable arm and at a front end of the trailer rear structure, and the movable arm is lowered relative to the raised position for the resting of the load over the movable arm and on the trailer rear structure.

17. The vehicle trailer system of claim 16, the carriage hitch comprises a hitch ball providing a ball-joint coupling with the load.

18. A vehicle trailer system for loading, transporting and unloading a load, the vehicle trailer system comprising:
   a trailer, arranged along a front-to-back, longitudinal direction, the trailer comprising:
      a trailer front structure for attachment to a towing vehicle;
      a trailer rear structure, pivotably attached to the trailer front structure about a side-to-side, transverse pivot axis;
      a carriage mounted on the trailer rear structure for bidirectional travel along the trailer rear structure and along the longitudinal direction;
      a carriage hitch ball carried by the carriage, the carriage hitch ball configured for providing a ball-joint coupling to the load on which the load can rotate sideways;
      a movable arm pivotably carried by the trailer rear structure;
      an arm actuator operably engaging the movable arm to pivot the movable arm; and
      at least one user-operable control for operating the arm actuator; wherein
   the vehicle trailer system is configured to adopt:
      a first configuration, in which the carriage is mounted on the trailer rear structure and the movable arm is positioned in a raised position extending over said carriage and rearward of said carriage hitch;
      a second configuration, in which the movable arm is lowered relative to the raised position, and further in which the carriage is traveling frontward on and alone the trailer rear structure and passing over the movable arm; and
      a third configuration, in which the carriage is arranged frontward of the movable arm and at a front end of the trailer rear structure, and the movable arm is lowered relative to the raised position for the resting of the load over the movable arm and on the trailer rear structure.

19. The vehicle trailer system of claim 18, further comprising a flexible, windable elongated element and a winch for winding and unwinding the flexible, winding elongated element, wherein the flexible, windable elongated element comprises a fastener for coupling to and pulling the load, and further wherein, in said first configuration, the flexible, windable elongated element is supported on and suspended from the movable arm and the fastener extends rearward of the carriage hitch.

20. The vehicle trailer system of claim 19, further comprising at least one user-operable control for operating the winch.

\* \* \* \* \*